United States Patent
Harada

(10) Patent No.: US 9,441,545 B2
(45) Date of Patent: Sep. 13, 2016

(54) FUEL SUPPLY APPARATUS, FUEL-FLOW-RATE-CONTROL UNIT, AND GAS-TURBINE POWER GENERATING PLANT

(71) Applicant: MITSUBISHI HEAVY INDUSTRIES, LTD., Tokyo (JP)

(72) Inventor: Shoichi Harada, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 10 days.

(21) Appl. No.: 13/728,661

(22) Filed: Dec. 27, 2012

(65) Prior Publication Data

US 2013/0180250 A1 Jul. 18, 2013

(30) Foreign Application Priority Data

Jan. 13, 2012 (JP) ................. 2012-005406

(51) Int. Cl.
*F02C 9/28* (2006.01)
*F02C 9/32* (2006.01)
(Continued)

(52) U.S. Cl.
CPC ............... *F02C 7/232* (2013.01); *F02C 9/28* (2013.01); *F02C 9/32* (2013.01); *F02C 9/40* (2013.01); *F02C 7/22* (2013.01); *F05D 2270/301* (2013.01); *F05D 2270/304* (2013.01)

(58) Field of Classification Search
CPC .......... F02C 7/22; F02C 7/222; F02C 7/232; F02C 9/28; F02C 9/32; F02C 9/40
USPC ............... 60/39.281, 734, 739, 740
See application file for complete search history.

(56) References Cited

U.S. PATENT DOCUMENTS 5,272,637 A * 12/1993 Urushidani et al. .......... 701/100
5,916,251 A * 6/1999 Sibik ............................. 62/148
(Continued)

FOREIGN PATENT DOCUMENTS

CN 1782344 A 6/2006
CN 1932264 A 3/2007
(Continued)

OTHER PUBLICATIONS

International Search Report of PCT/JP2012/082972, date of mailing Mar. 19, 2013, with Partial Translation (5 pages).
(Continued)

*Primary Examiner* — Phutthiwat Wongwian
*Assistant Examiner* — Rene Ford
(74) *Attorney, Agent, or Firm* — Westerman, Hattori, Daniels & Adrian, LLP

(57) ABSTRACT

A fuel supply apparatus is provided with a plurality of flow-rate regulating valves that regulate the flow rate of fuel flowing in a fuel supply line; a calculating section that calculates a required flow-rate coefficient on the basis of at least a fuel pressure in the fuel flow upstream of the flow-rate regulating valves, a pressure determined in advance as a fuel pressure downstream of the flow-rate regulating valves, and the flow rate of fuel to be supplied to one fuel nozzle among different kinds of fuel nozzles, the required flow-rate coefficient being the coefficient of the flow-rate regulating valve corresponding to the one fuel nozzle; and a valve control section that controls the degree-of-opening of the flow-rate regulating valve corresponding to the one fuel nozzle on the basis of the required flow-rate coefficient.

17 Claims, 20 Drawing Sheets

(51) Int. Cl.
*F02C 7/232* (2006.01)
*F02C 9/40* (2006.01)
*F02C 7/22* (2006.01)

(56) References Cited

U.S. PATENT DOCUMENTS

| | | | |
|---|---|---|---|
| 6,199,362 B1* | 3/2001 | Hepner | 60/773 |
| 6,446,498 B1* | 9/2002 | Schricker et al. | 73/114.74 |
| 6,837,480 B1* | 1/2005 | Carlson | 251/209 |
| 7,549,293 B2 | 6/2009 | Gallagher et al. | |
| 7,756,626 B2* | 7/2010 | Fujii et al. | 701/100 |
| 2004/0112038 A1* | 6/2004 | Tanaka et al. | 60/39.27 |
| 2006/0107666 A1 | 5/2006 | Kothnur et al. | |
| 2007/0079593 A1* | 4/2007 | Fujii et al. | 60/39.27 |
| 2007/0089395 A1 | 4/2007 | Fujii et al. | |
| 2007/0101724 A1* | 5/2007 | Gadde et al. | 60/773 |
| 2011/0130941 A1 | 6/2011 | Szepek et al. | |

FOREIGN PATENT DOCUMENTS

| | | | | |
|---|---|---|---|---|
| CN | 1932265 A | 3/2007 | | |
| JP | 2001-329863 A | 11/2001 | | |
| JP | 2002-364385 A | 12/2002 | | |
| JP | 2007011717 A | * 1/2007 | | G05D 16/20 |
| JP | 2007-077867 A | 3/2007 | | |
| JP | 2008-082302 A | 4/2008 | | |

OTHER PUBLICATIONS

Written Opinion of International Application No. PCT/JP2012/082972, date of mailing Mar. 19, 2013, with English translation (7 pages).
Decision to Grant a Patent dated Mar. 31, 2015, issued in corresponding Japanese Patent Application No. 2013-553230 (3 pages).
Decision to Grant a Patent dated Sep. 18, 2015, issued in counterpart Korean Patent Application No. 2014-7018481, (2 pages).
Notification od the Decision to Grant a Patent Right for Patent for Invention dated Apr.22, 2016, issued counterpart Chinese Patent Application No. 201280066603.0, with English translation. (2 pages). Explanation of Relevancy—"The Notification of the Decision to Grant a Patent Right has been received."

* cited by examiner

FIG. 20
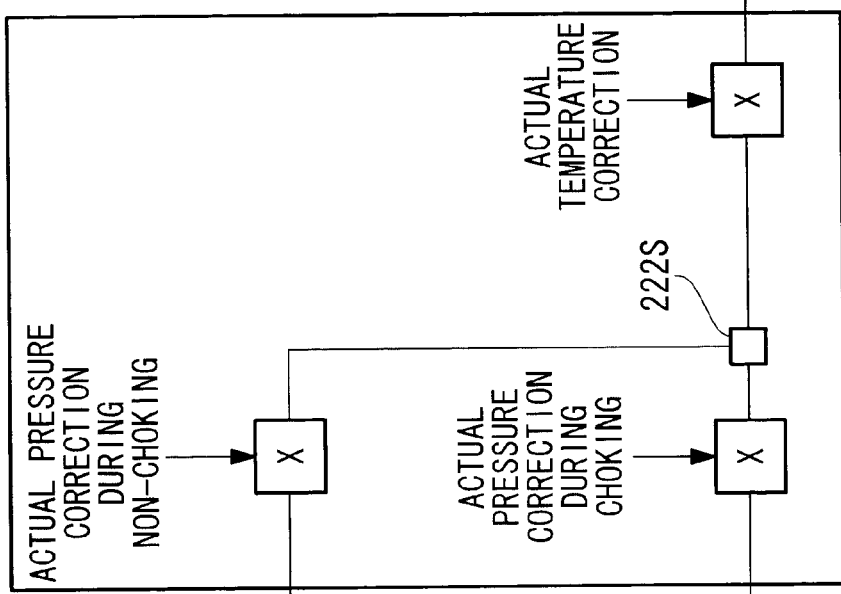
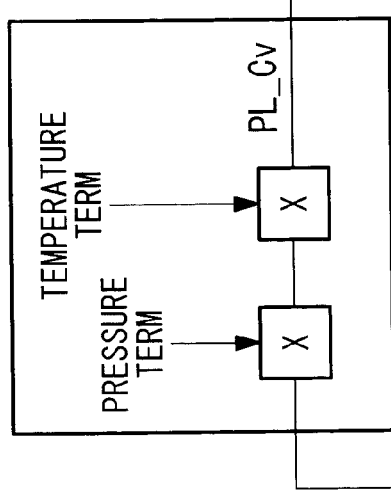
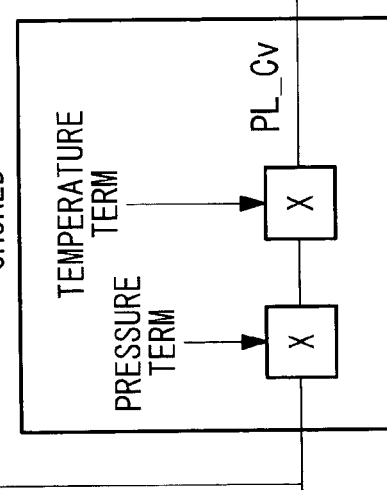

FUEL SUPPLY APPARATUS, FUEL-FLOW-RATE-CONTROL UNIT, AND GAS-TURBINE POWER GENERATING PLANT

CROSS-REFERENCE TO RELATED APPLICATIONS

This application is based on Japanese Patent Application No. 2012-005406, the contents of which are incorporated herein by reference.

TECHNICAL FIELD

The present invention relates to a fuel supply apparatus, a fuel-flow-rate control unit, and a gas-turbine power generating plant.

BACKGROUND ART

In general, gas turbines are mainly provided with a compressor, a combustor, a turbine, and so on.

Among them, a known combustor is equipped with a plurality of kinds of fuel nozzles to achieve a reduction in the amount of NOx emission under a high load and combustion stability under a low load, for example, a DLN (dry low NOx) combustor (for example, see PTL (Patent Literature) 1).

Known examples of the above-described combustor are equipped with a main nozzle for premixed combustion and a pilot nozzle for diffusion combustion, and in addition to those, a top hat nozzle for premixed combustion designed to further reduce the amount of NOx emission.

The gas turbine is further provided with a fuel line that supplies fuel to the combustor, and the fuel line is configured to independently supply fuel to various kinds of fuel nozzles, such as the above main nozzle and pilot nozzle. On the other hand, the above fuel line is provided with various kinds of adjusting valve that regulate the pressure and flow rate of fuel to be supplied to the main nozzle and so on.

The above-described PTL 1 discloses an example in which fuel lines that supply fuel to the various kinds of fuel nozzles are each provided with a pressure adjusting valve, a flow-rate adjusting valve, a main nozzle, and so on, from the upstream side of the fuel flow.

Here, the pressure adjusting valve maintains a flow-rate-adjusting-valve differential pressure, that is, the difference between the pressure of fuel upstream of the flow-rate adjusting valve and the pressure of fuel downstream thereof, constant, and the flow-rate adjusting valve regulates the flow rate of fuel to be supplied to the main nozzle and so on disposed at the downstream side.

The flow-rate adjusting valve is controlled under constant differential pressure conditions, and the flow rate of the fuel is determined by calculation based on the flow-rate coefficient (Cv value) of the flow-rate adjusting valve. In the case of the invention disclosed in PTL 1, the flow of fuel in the flow-rate adjusting valve is always in a non-choked flow region. Therefore, a pressure term used in calculating the Cv value is expressed as a function of the pressure downstream of the flow-rate adjusting valve.

Here, the non-choked flow region is a region in which the pressure Pout of fuel at the outlet (downstream side) of the flow-rate adjusting valve and the pressure Pin of fuel at the inlet (upstream side) satisfy the following relationship:

$$Pout > Pin/2$$

Specifically, the individual pressure adjusting valves are controlled so as to maintain constant differential pressures at the flow-rate adjusting valves provided in the individual fuel lines. On the other hand, the flow-rate adjusting valves are controlled on the basis of the actual measured fuel pressures and temperatures of fuel downstream of the flow-rate adjusting valves under constant differential pressures conditions and the degrees-of-opening calculated from the flow rates of fuel to be supplied to the main nozzle and so on, input from the outside.

CITATION LIST

Patent Literature

{PTL 1} Japanese Unexamined Patent Application, Publication No. 2007-77867

SUMMARY OF INVENTION

Technical Problem

In the invention disclosed in PTL 1 described above, a pressure-adjusting-valve differential pressure (that is, the difference between the pressure of fuel upstream of the pressure adjusting valve and the pressure of fuel downstream thereof) is larger than the flow-rate-adjusting-valve flow rate control valve differential pressure. Therefore, the responsiveness of the entire fuel line depends on the responsiveness of the pressure adjusting valve.

Because the pressure adjusting valve may cause a problem, such as hunting, there is a limitation to enhancing the responsiveness thereof. Thus, there is a problem in that an increase in the responsiveness of the entire fuel line is limited by the responsiveness of the pressure adjusting valve.

On the other hand, since a plurality of fuel lines are provided, and the fuel lines are each provided with a pressure adjusting valve and a flow-rate adjusting valve, the number of necessary valves increases, thus causing a problem of increased manufacturing costs. Furthermore, the need for a large number of valves causes problems in that it is difficult to ensure a space for disposing the fuel lines and that it is difficult to reduce the size.

In addition, since the flow-rate-adjusting-valve differential pressure is controlled to a constant level by the pressure adjusting valve, it is necessary to maintain the fuel pressure upstream of the pressure adjusting valve at a predetermined high pressure. To achieve this, the invention of PTL 1 needs to provide boosting equipment in the gas-turbine power generating plant, which causes the problem of increased manufacturing costs.

The present invention is made to solve the above problems, and an object thereof is to provide a fuel supply apparatus, a fuel-flow-rate control unit, and a gas-turbine power generating plant in which responsiveness to changes in the load of a gas turbine is enhanced and which can easily be manufactured so that the manufacturing costs can be reduced.

Solution to Problem

To achieve the above object, the present invention provides the following solutions.

A fuel supply apparatus according to a first aspect of the present invention is a fuel supply apparatus configured to control the flow rates of fuel to be supplied to fuel nozzles provided in a combustor of a gas turbine, the apparatus including: flow-rate regulating valves which are provided in fuel supply lines that supply fuel to the fuel nozzles and which regulate the flow rates of fuel flowing through the fuel supply lines; a calculating section that calculates required flow-rate coefficients of the flow-rate regulating valves corresponding to the fuel nozzles on the basis of at least a fuel pressure in the fuel flow upstream of the flow-rate regulating valves, a pressure determined in advance as a fuel pressure downstream of the flow-rate regulating valves, and the flow rates of fuel to be supplied to the fuel nozzles; and a valve control section that controls the degrees-of-opening of the flow-rate regulating valves corresponding to the fuel nozzles on the basis of the required flow-rate coefficients.

A fuel-flow-rate control unit according to a second aspect of the present invention is a fuel-flow-rate control unit configured to control flow rates of fuel to be supplied to fuel nozzles provided in a combustor of a gas turbine, the control unit including a calculating section that calculates required flow-rate coefficients of flow-rate regulating valves corresponding to the fuel nozzles on the basis of at least a fuel pressure in the fuel flow upstream of the flow-rate regulating valves that regulate the flow rates of fuel to be supplied to the fuel nozzles, a pressure determined in advance as a fuel pressure downstream of the flow-rate regulating valves, and the flow rates of fuel to be supplied to the fuel nozzles; and a valve control section that controls the degrees-of-opening of the flow-rate regulating valves on the basis of the required flow-rate coefficients.

According to the first aspect and the second aspect described above, the flow rates of fuel to be supplied to the fuel nozzles are regulated by controlling the degrees-of-opening of the flow-rate regulating valves. Therefore, the responsiveness of the fuel supply apparatus of the first aspect and the fuel-flow-rate control unit of the second aspect described above to an input for changing the flow rates of fuel to be supplied to the fuel nozzles increases as compared with the invention disclosed in PTL 1.

Specifically, the fuel supply apparatus of the first aspect and the fuel-flow-rate control unit of the second aspect described above respond to an input for changing the flow rates of fuel by mainly controlling the degrees-of-opening of the flow-rate regulating valves. That is, they can respond thereto without using a pressure regulating valve or the like having lower responsiveness than the flow-rate regulating valves.

Thus, the fuel supply apparatus of the first aspect and the fuel-flow-rate control unit of the second aspect described above can respond more quickly to the input for changing the fuel flow rates described above, as compared with the invention of PTL 1 that responds thereto using the pressure regulating valves and the flow-rate regulating valves.

On the other hand, since no pressure regulating valve is provided, the number of pressure regulating valves can be reduced as compared with the invention of PTL 1, in which the fuel supply lines are each provided with a pressure regulating valve. This reduces the space necessary for installing the fuel supply apparatus of the first aspect described above, thus making it easy to install the fuel supply apparatus in a gas-turbine power generating plant.

Furthermore, since there is no need to take into account pressure loss in a pressure regulating valve, the pressure of fuel to be supplied to the combustor can be kept low as compared with the invention of PTL 1.

Furthermore, the degrees-of-opening of the flow-rate regulating valves can be controlled in both the choked region and the non-choked region by using the upstream-side fuel pressure and the downstream-side pressure, and so on, described above.

The fuel supply apparatus of the first aspect described above may further include a pressure measuring unit that measures a fuel pressure upstream of the flow-rate regulating valves. In the first aspect and the second aspect described above, preferably, the measured pressure is used as the upstream-side fuel pressure for use in calculating the required flow-rate coefficients.

According to the first aspect and the second aspect described above, the required flow-rate coefficients are calculated on the basis of the measured upstream-side fuel pressure. Therefore, even if the pressure of supplied fuel changes, the required flow-rate coefficients are calculated on the basis of the pressure of fuel after the change, and the degrees-of-opening of the flow-rate regulating valves are controlled on the basis of the required flow-rate coefficients.

In the first aspect described above, the fuel nozzles may be different kinds of fuel nozzles; and the apparatus may further include a plurality of flow-rate regulating valves which are provided in a plurality of fuel supply lines that supply fuel independently to the different kinds of nozzles and which regulate the flow rates of fuel flowing through the fuel supply lines. The first aspect and the second aspect described above may further include a calculating section that calculates a required flow-rate coefficient on the basis of at least a fuel pressure in the fuel flow upstream of flow-rate regulating valves that regulate the flow rates of fuel to be supplied to the different kinds of fuel nozzles, a pressure determined in advance as a fuel pressure downstream of the flow-rate regulating valves, and the flow rate of fuel to be supplied to one fuel nozzle among the different kinds of fuel nozzles, the required flow-rate coefficient being the coefficient of the flow-rate regulating valve corresponding to the one fuel nozzle; and a valve control section that controls the degree-of-opening of the flow-rate regulating valve corresponding to the one fuel nozzle on the basis of the required flow-rate coefficient.

Here, the fact that the kinds of fuel nozzles differ indicates that the fuel supply lines supplied with fuel differ, such as a main nozzle, a pilot nozzle, and a top hat nozzle.

The first aspect described above may further include a pressure regulating section which is provided in a common line that supplies fuel to all of the fuel supply lines and which regulates the fuel pressure upstream of the flow-rate regulating valves to a predetermined value. In the first aspect and the second aspect described above, preferably, a predetermined pressure is used as the upstream-side fuel pressure for use in calculating the required flow-rate coefficients.

According to the first aspect described above, since the pressure regulating section is disposed in the common line that supplies fuel to all the fuel supply lines, the pressure regulating section is not influenced by changes in the fuel distribution ratio among the fuel supply lines. This can suppress variations in the specifications required for the pressure regulating section, thus making it easy to use common specifications for the pressure regulating section.

On the other hand, since the pressure regulating section controls the fuel pressure upstream of the flow-rate regulating valves to a predetermined value, for example, a fixed value, the responsiveness requirement is lower than the pressure regulating valves of the invention of PTL 1 in which the differential pressures at the flow-rate regulating valves are maintained constant, and pressure loss at the pressure regulating section can be suppressed. Therefore, the pressure of fuel to be supplied to the common line and the pressure regulating section can be kept low as compared with the invention of PTL 1.

Furthermore, even if the pressure of fuel supplied to the common line changes, the pressure is regulated to a predetermined value by the pressure regulating section. Since changes in the pressure of fuel flowing into the flow-rate regulating valves can be suppressed, the pressure difference between an actual upstream-side fuel pressure and the predetermined pressure used to calculate the required flow-rate coefficients is reduced.

Since the predetermined upstream-side fuel pressure is used to calculate the required flow-rate coefficients, the required flow-rate coefficients can be calculated without being influenced by changes in the measured fuel pressure as compared with a method using the actually measured upstream-side fuel pressure.

In the first aspect and the second aspect described above, preferably, the flow rate of fuel to be supplied to the one fuel nozzle is calculated from the total flow rate of fuel to be supplied to the combustor, the total flow rate being determined on the basis of a load of the gas turbine, and a fuel distribution ratio among the different kinds of fuel nozzles; and the upstream-side fuel pressure is a pressure determined on the basis of the total flow rate of fuel.

According to the first aspect and the second aspect described above, it is possible to ensure uniqueness between the flow rate of fuel to be supplied to one fuel nozzle and the flow rate of fuel that is actually supplied to the one fuel nozzle.

For example, if the required flow-rate coefficients are calculated using a fuel pressure that is actually measured upstream of the flow-rate regulating valves, uniqueness between the flow rate of fuel to be supplied to one fuel nozzle in a transient state and the flow rate of fuel that is actually supplied to the one fuel nozzle is not maintained, and thus the controllability of the gas turbine could deteriorate.

In other words, since the predetermined upstream-side fuel pressure is used to calculate the required flow-rate coefficients, the required flow-rate coefficients can be calculated without being influenced by changes in the measured fuel pressure, as compared with the method using the actually measured upstream-side fuel pressure.

In the first aspect and the second aspect described above, preferably, the flow rate of fuel to be supplied to the one fuel nozzle is calculated from the total flow rate of fuel to be supplied to the combustor, the total flow rate being determined on the basis of the load of the gas turbine, and the fuel distribution ratio among the different kinds of fuel nozzles; and the downstream-side fuel pressure is a pressure determined on the basis of the total flow rate of fuel.

According to the first aspect and the second aspect described above, since a predetermined downstream-side fuel pressure is used to calculate the required flow-rate coefficients, the influence of changes in the measured fuel gas pressure on the calculated required flow-rate coefficients can be suppressed as compared with a method using an actually measured downstream-side fuel pressure.

Furthermore, the influence of the measured fuel gas pressure on the fuel distribution ratio among different kinds of fuel nozzles can be suppressed as compared with the method using only the actually measured downstream-side fuel pressure.

For example, if at least one of a plurality of actually measured downstream-side fuel pressures corresponding to the different kinds of fuel nozzles is an inaccurate fuel pressure due to a fault or the like in the measuring instrument, the required flow-rate coefficients are calculated on the basis of the inaccurate fuel pressure, thus influencing the fuel distribution ratio among the different kinds of fuel nozzles.

However, the influence of a fault or the like in the measuring instrument can be eliminated by calculating the required flow-rate coefficients by using the predetermined downstream-side fuel pressure, thus suppressing the influence on the fuel distribution ratio among the different kinds of fuel nozzles.

In the first aspect and the second aspect described above, preferably, the downstream-side fuel pressure is a pressure calculated on the basis of a pressure in a casing in which the fuel nozzles are disposed; and the pressure in the casing in which the fuel nozzles are disposed is a pressure determined in advance on the basis of the total flow rate of fuel.

According to the first aspect and the second aspect described above, since the downstream-side fuel pressure calculated on the basis of the predetermined casing internal pressure is used to calculate the required flow-rate coefficients, the required flow-rate coefficients can be calculated without being influenced by changes in the measured fuel pressure, as compared with the method using an actually measured downstream-side fuel pressure.

Furthermore, the required flow-rate coefficients can be calculated by calculating the downstream-side fuel pressures corresponding to the individual fuel nozzles by using the predetermined casing internal pressure as a common parameter. This allows fuel distribution among the fuel nozzles to be suitably performed as compared with a method that does not use the casing internal pressure.

On the other hand, in the case where the predetermined downstream-side fuel pressure is used, when the differential pressure between the predetermined downstream-side fuel pressure and an actual downstream-side fuel pressure increases, it is necessary to change the predetermined downstream-side fuel pressure for each of the fuel nozzles, thus making it difficult to change them. In particular, it is difficult to change them at the site where the gas-turbine power generating plant is installed.

In contrast, the method of calculating the downstream-side fuel pressure on the basis of the predetermined casing internal pressure has only to change only one predetermined casing internal pressure, thus making it easy to cope with this issue.

Furthermore, it is preferable to use a method of calculating the downstream-side fuel pressure on the basis of pressure loss in one fuel nozzle, in addition to the predetermined casing internal pressure, described above. Furthermore, it is more preferable to use a method of calculating the downstream-side fuel pressure also on the basis of pressure loss from the flow-rate regulating valve to one fuel nozzle in a fuel supply line.

In other words, in the case where fuel pressures downstream of the flow-rate regulating valves corresponding to the individual different kinds of fuel nozzles are calculated, the downstream-side fuel pressures corresponding to the individual different kinds of fuel nozzles described above can be calculated on the basis of the common predetermined casing internal pressure and pressure losses in the individual different kinds of fuel nozzles.

Furthermore, the downstream-side fuel pressures corresponding to the individual different kinds of fuel nozzles, described above, can be calculated more accurately on the basis of the pressure loss from the flow-rate regulating valve to the one fuel nozzle in the fuel supply line.

In the first aspect and the second aspect described above, preferably, a correcting section that corrects the required flow-rate coefficients calculated by the calculating section on the basis of at least an actual measured value of the pressure in the casing is further provided.

According to the first aspect and the second aspect described above, deviations included in the required flow-rate coefficients calculated by the calculating section can be corrected using the actual measured value of the casing internal pressure.

Specifically, the deviations included in the calculated required flow-rate coefficients because the casing internal pressure used to calculate the required flow-rate coefficients include an error, a deviation, and so on can be corrected.

A gas-turbine power generating plant according to a third aspect of the present invention includes a compressor that compresses air; a combustor that generates high-temperature combustion gas by burning a gas mixture of the compressed air and fuel; a turbine that extracts a rotary driving force from the combustion gas; and any of the above-described fuel supply apparatuses according to the first aspect that supply the fuel to the combustor.

According to the third aspect described above, since the fuel supply apparatus of the first aspect described above is provided, the responsiveness to an input for changing the flow rates of fuel to be supplied to the individual fuel nozzles increases.

Furthermore, the fuel supply apparatus of the first aspect described above can easily be installed in the gas-turbine power generating plant.

Advantageous Effects of Invention

The fuel supply apparatus, the fuel-flow-rate control unit, and the gas-turbine power generating plant of the present invention are configured such that the flow rate of fuel to be supplied to the fuel nozzles can be regulated by controlling the degrees-of-opening of the flow-rate regulating valves, thus providing the advantage of enhancing the responsiveness.

On the other hand, since no pressure regulating valve is provided, the present invention provides advantages in that the fuel supply apparatus can be reduced in size, and the fuel supply apparatus can be easily installed in the gas-turbine power generating plant, thus making it easy to manufacture the gas-turbine power generating plant, and reducing the manufacturing costs.

Furthermore, since there is no need to take into account pressure loss in a pressure regulating valve, or the pressure loss is small, the pressure of fuel to be supplied to the combustor can be kept low. This allows the performance level required for the fuel supply facility to be lowered, thus offering the advantage of reducing the manufacturing costs of the gas-turbine power generating plant.

BRIEF DESCRIPTION OF DRAWINGS

FIG. 20 is a diagram illustrating part of the control logic of the control unit in FIG. 17.

DESCRIPTION OF EMBODIMENTS

First Embodiment

A first embodiment of the present invention will be described hereinbelow with reference to FIGS. 1 to 12.

Figure 1:
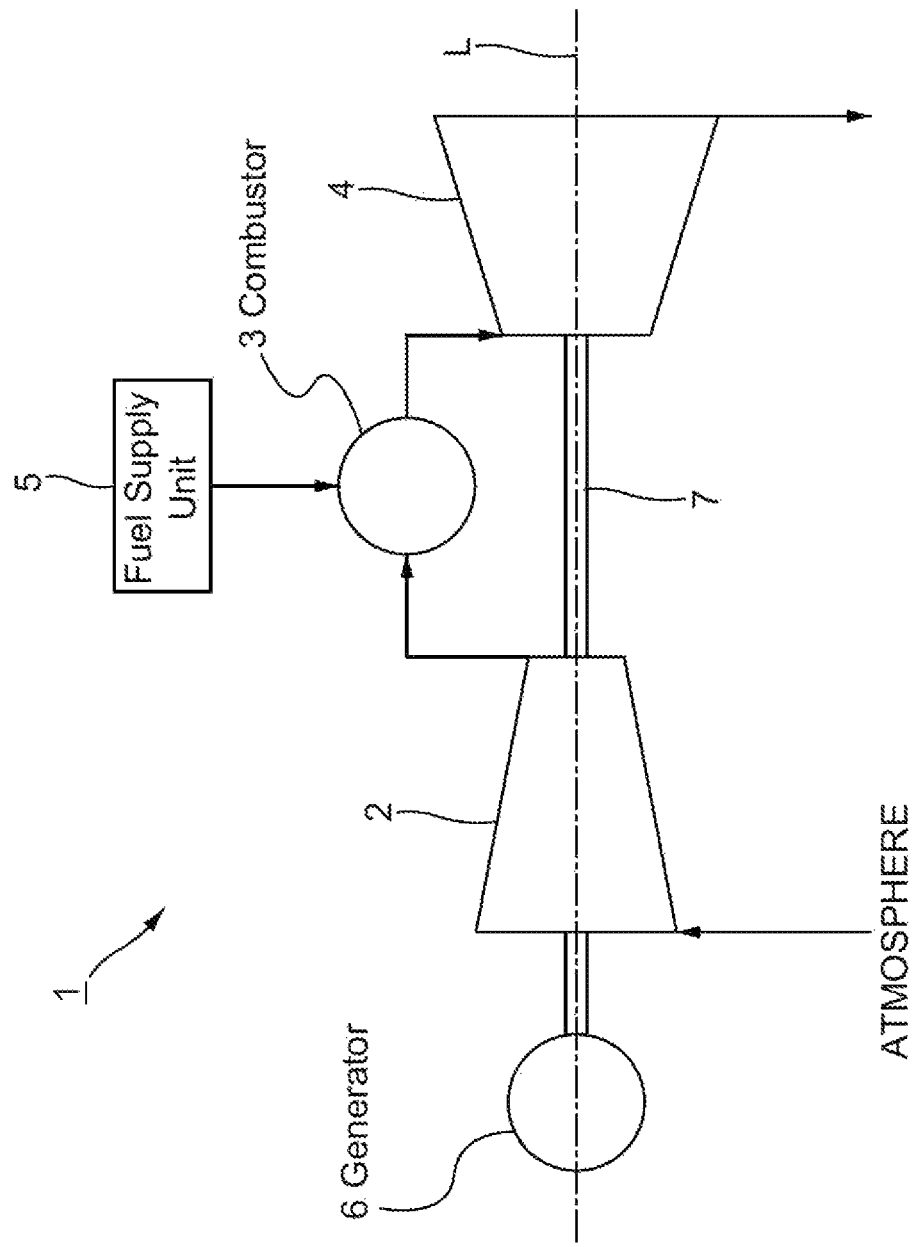
FIG. 1 is a schematic diagram illustrating, in outline, the configuration of a gas-turbine power generating plant according to a first embodiment of the present invention.

FIG. 1 is a schematic diagram illustrating, in outline, the configuration of a gas-turbine power generating plant according to this embodiment.

Here, a gas-turbine power generating plant 1 of this embodiment will be described as applied to a gas-turbine power generating plant that uses gaseous fuel gas as fuel and in which a generator in, for example, an electric power generating facility, is rotationally driven to generate electricity.

As shown in FIG. 1, the gas-turbine power generating plant 1 is mainly provided with a compressor 2, a combustor 3, a turbine 4, a fuel supply unit (fuel supply apparatus) 5, and a generator 6.

As shown in FIG. 1, the compressor 2 takes in the atmosphere, which is outside air, compresses it, and supplies the compressed air to the combustor 3.

Note that the compressor 2 may have a known configuration and is not particularly limited thereto.

As shown in FIG. 1, the combustor 3 mixes the air compressed by the compressor 2 and fuel gas supplied from the outside and burns the mixed gas mixture to produce high-temperature combustion gas.

As shown in FIG. 1, the turbine 4 receives the high-temperature gas produced by the combustor 3 to generate a rotary driving force and transmits the generated rotary driving force to a rotary shaft 7.

Note that the turbine 4 may have a known configuration and is not particularly limited thereto.

The generator 6 generates electricity by using the rotary driving force transmitted from the turbine 4.

Note that the generator 6 may have a known configuration and is not particularly limited thereto.

Figure 2:
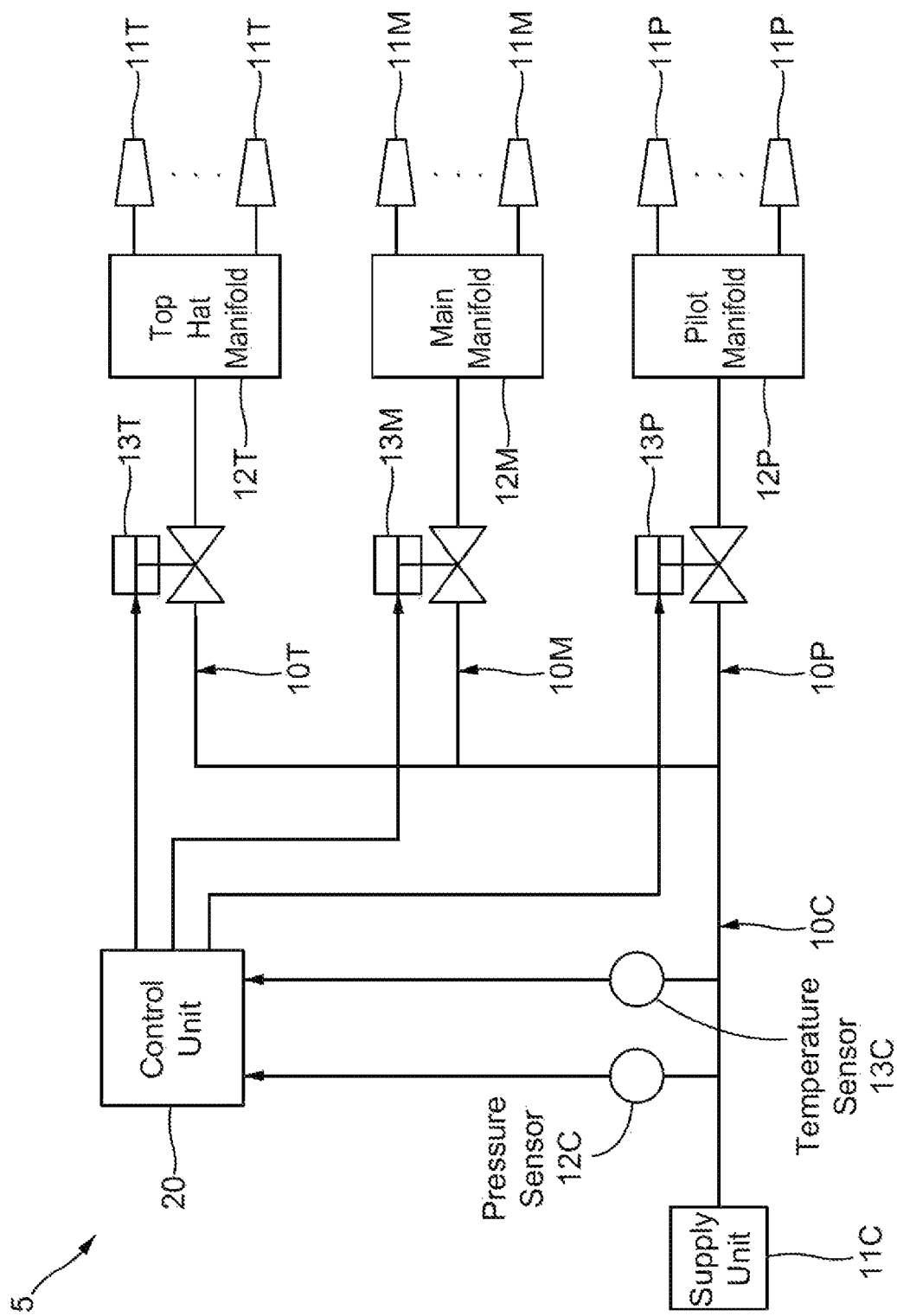
FIG. 2 is a schematic diagram illustrating the flow of fuel gas in a fuel supply unit and a combustor in FIG. 1.

FIG. 2 is a schematic diagram illustrating the flow of fuel gas in the fuel supply unit and the combustor in FIG. 1.

As shown in FIG. 1, the fuel supply unit 5 supplies fuel gas to the combustor 3. Specifically, as shown in FIG. 2, the fuel supply unit 5 supplies fuel gas to pilot nozzles (fuel nozzles) 11P, main nozzles (fuel nozzles) 11M, and top hat nozzles (fuel nozzles) 11T provided in the combustor 3.

Here, the pilot nozzles 11P are nozzles for diffusion combustion for the purpose of stabilizing combustion. The main nozzles 11M are nozzles for premixed combustion for the purpose of reducing NOx.

The top hat nozzles 11T are nozzles for premixed combustion for the purpose of further reducing NOx.

Note that the configuration of the combustor 3 equipped with the pilot nozzles 11P, the main nozzles 11M, and the top hat nozzles 11T may be a known configuration, such as the configuration shown in PTL 1 described above, and is not particularly limited.

The fuel supply unit 5 is mainly provided with a common line 10C, a main fuel supply line (fuel supply line) 10M, a pilot fuel supply line (fuel supply line) 10P, a top-hat fuel supply line (fuel supply line) 10T, and a control unit (fuel-flow-rate control unit) 20.

As shown in FIG. 2, the common line 10C is a line that supplies fuel gas to the pilot fuel supply line 10P, the main fuel supply line 10M, and the top-hat fuel supply line 10T.

One end of the common line 10C is connected to a supply unit 11C that supplies fuel gas, and the other end is connected to the pilot fuel supply line 10P, the main fuel supply line 10M, and the top-hat fuel supply line 10T.

Furthermore, the common line 10C is provided with a common pressure sensor (pressure measuring unit) 12C that measures the pressure of the fuel gas and a common temperature sensor 13C that measures the temperature of the fuel gas.

The common pressure sensor 12C measures a fuel gas pressure $P1m$ of the fuel gas flowing upstream of a pilot flow-rate regulating valve 13P, a main flow-rate regulating valve 13M, and a top-hat flow-rate regulating valve 13T, described later.

As shown in FIG. 2, the pilot fuel supply line 10P is a line that supplies fuel gas to the pilot nozzles 11P.

One end of the pilot fuel supply line 10P is connected to the common line 10C, and the other end is connected to a pilot manifold 12P that supplies fuel to the pilot nozzles 11P.

Furthermore, the pilot fuel supply line 10P is provided with a pilot flow-rate regulating valve (flow-rate regulating valve) 13P that controls the flow rate of the fuel gas.

The pilot flow-rate regulating valve 13P is a valve that regulates the flow rate of fuel gas to be supplied to the pilot nozzles 11P.

Note that the pilot flow-rate regulating valve 13P may be a known valve and is not particularly limited.

As shown in FIG. 2, the pilot manifold 12P distributes the fuel gas supplied from the pilot fuel supply line 10P to the plurality of pilot nozzles 11P.

The pilot fuel supply line 10P and the plurality of pilot nozzles 11P are connected to the pilot manifold 12P so that the fuel gas can circulate therethrough.

Note that the shape of the pilot manifold 12P may be a known shape and is not particularly limited.

As shown in FIG. 2, the main fuel supply line 10M is a line that supplies fuel gas to the main nozzles 11M.

One end of the main fuel supply line 10M is connected to the common line 10C, and the other end is connected to a main manifold 12M that supplies fuel to the main nozzles 11M.

Furthermore, the main fuel supply line 10M is provided with a main flow-rate regulating valve (flow-rate regulating valve) 13M that controls the flow rate of the fuel gas.

The main flow-rate regulating valve 13M is a valve that regulates the flow rate of fuel gas to be supplied to the main nozzles 11M.

Note that the main flow-rate regulating valve 13M may be a known valve and is not particularly limited.

As shown in FIG. 2, the main manifold 12M distributes the fuel gas supplied from the main fuel supply line 10M to the plurality of main nozzles 11M.

The main fuel supply line 10M and the plurality of main nozzles 11M are connected to the main manifold 12M so that the fuel gas can circulate therethrough.

Note that the shape of the main manifold 12M may be a known shape and is not particularly limited.

As shown in FIG. 2, the top-hat fuel supply line 10T is a line that supplies fuel gas to the top hat nozzles 11T.

One end of the top-hat fuel supply line 10T is connected to the common line 10C, and the other end is connected to a top hat manifold 12T that supplies fuel to the top hat nozzles 11T.

Furthermore, the top-hat fuel supply line 10T is provided with a top-hat flow-rate regulating valve (flow-rate regulating valve) 13T that controls the flow rate of the fuel gas.

The top-hat flow-rate regulating valve 13T is a valve that regulates the flow rate of fuel gas to be supplied to the top hat nozzles 11T.

Note that the top-hat flow-rate regulating valve 13T may be a known valve and is not particularly limited.

As shown in FIG. 2, the top hat manifold 12T distributes the fuel gas supplied from the top-hat fuel supply line 10T to the plurality of top hat nozzles 11T.

The top-hat fuel supply line 10T and the plurality of top hat nozzles 11T are connected to the top hat manifold 12T so that the fuel gas can circulate therethrough.

Note that the shape of the top hat manifold 12T may have a known shape and is not particularly limited.

Figure 3:
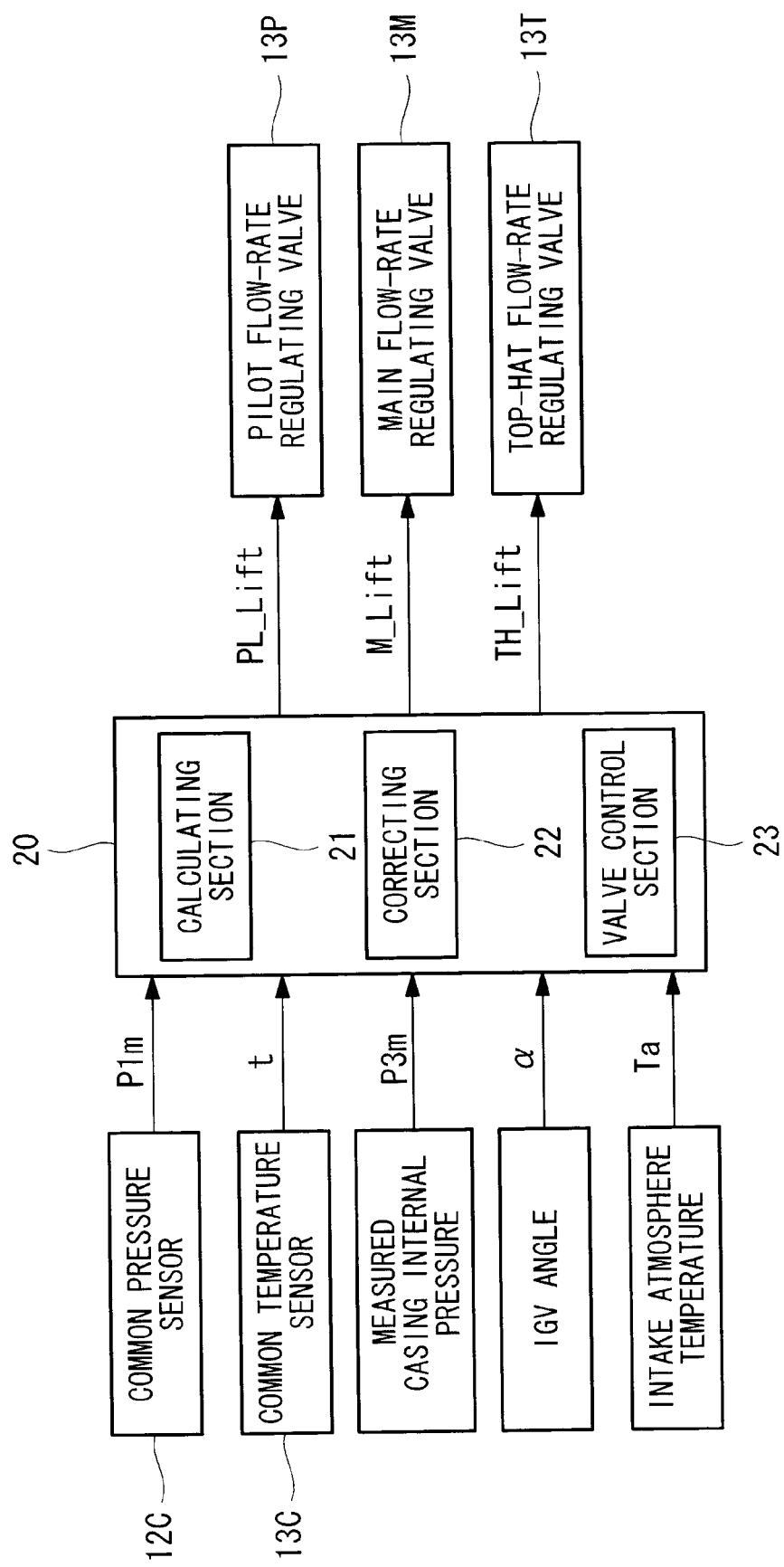
FIG. 3 is a block diagram illustrating the configuration of a control unit in FIG. 2.

FIG. 3 is a block diagram illustrating the configuration of the control unit in FIG. 2.

As shown in FIGS. 2 and 3, the control unit 20 controls the degrees-of-opening of the pilot flow-rate regulating valve 13P, the main flow-rate regulating valve 13M, and the top-hat flow-rate regulating valve 13T.

As shown in FIG. 3, the control unit 20 is provided with a calculating section 21, a correcting section 22, and a valve control section 23.

The details of control performed by the control unit 20 will be described below.

The calculating section 21 calculates a fuel-flow-rate command value (hereinafter referred to as "CSO") on the basis of a load command and calculates a pilot fuel-flow-rate command (hereinafter referred to as "PL_CSO"), a main fuel-flow-rate command (hereinafter referred to as "M_CSO"), and a top-hat fuel-flow-rate command (hereinafter referred to as "TH_CSO").

Furthermore, the calculating section 21 calculates a required flow-rate coefficient for the pilot flow-rate regulating valve 13P (hereinafter referred to as "PL_Cv"), a required flow-rate coefficient for the main flow-rate regulating valve 13M (hereinafter referred to as "M_Cv"), and a required flow-rate coefficient for the top-hat flow-rate regulating valve 13T (hereinafter referred to as "TH_Cv").

The correcting section 22 corrects the values of PL_Cv, M_Cv, and TH_Cv calculated by the calculating section.

The valve control section 23 calculates the degree-of-opening of the pilot flow-rate regulating valve 13P (hereinafter referred to as "PL_Lift"), the degree-of-opening of the main flow-rate regulating valve 13M (hereinafter referred to as "M_Lift"), and the degree-of-opening of the top-hat flow-rate regulating valve 13T (hereinafter referred to as "TH_Lift") on the basis of the values of PL_Cv, M_Cv, and TH_Cv corrected by the correcting section 22, respectively.

Next, the general operation of the gas-turbine power generating plant 1 with the above configuration will be described, and thereafter, fuel-gas supply control performed by the control unit 20 will be described.

As shown in FIG. 1, the gas-turbine power generating plant 1 takes in the atmosphere (air) by the compressor 2 being rotationally driven. The taken-in atmosphere is compressed by the compressor 2 and is discharged toward the combustor 3.

The compressed air flowing into the combustor 3 is mixed in the combustor 3 with fuel gas supplied from the outside. The gas mixture of air and fuel gas is burned in the combustor 3 to produce high-temperature combustion gas due to the heat of combustion.

The combustion gas produced in the combustor 3 is supplied from the combustor 3 to the downstream turbine 4. The turbine 4 is rotationally driven by the combustion gas, and the rotary driving force thereof is transmitted to the rotary shaft 7. The rotary shaft 7 transmits the rotary driving force extracted in the turbine 4 to the compressor 2 and the generator 6.

Next, fuel-gas supply control performed by the control unit 20, which is a feature of this embodiment, will be described with reference to FIGS. 3 to 6 and so on.

Figure 4:
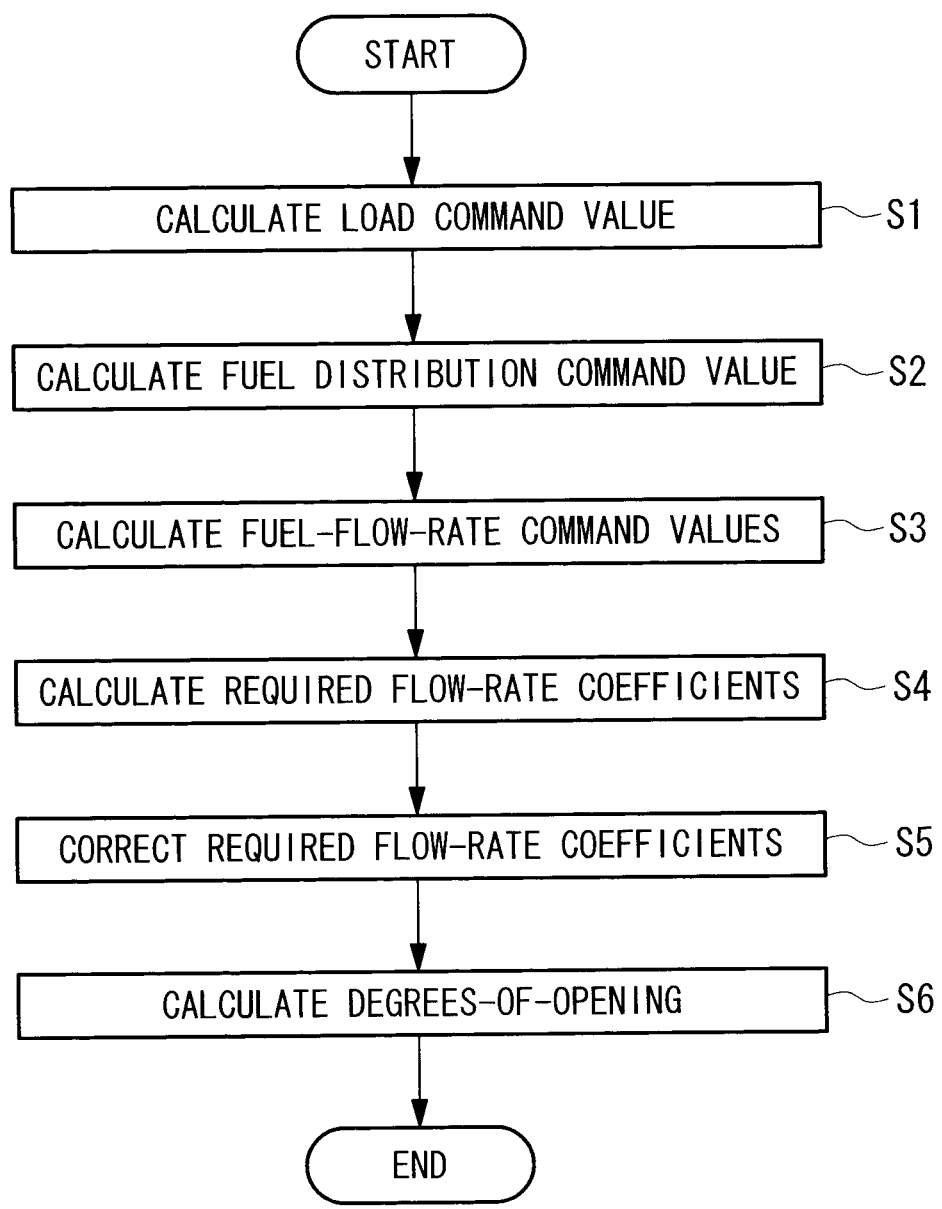
FIG. 4 is a flowchart illustrating the fuel-gas supply control method of the control unit in FIG. 3.

FIG. 4 is a flowchart illustrating the fuel-gas supply control method of the control unit in FIG. 3. FIGS. 5 to 8 are diagrams illustrating the fuel-gas supply control logic of the control unit in FIG. 3.

In the control unit 20 of the gas-turbine power generating plant 1 of this embodiment, the calculating section 21 calculates the load command value of the gas-turbine power generating plant 1 on the basis of a generator-output command value sent from a central power supply center that manages the generator output of a power generation facility (step S1). The calculating section 21 sets CSO on the basis of the load command value.

Thereafter, the calculating section 21 calculates fuel-distribution command values. Specifically, the calculating section 21 calculates PL_CSO, M_CSO, and TH_CSO on the basis of CSO and CLCSO, which is a dimensionless gas-turbine-inlet combustion gas temperature (step S2).

Figure 5:
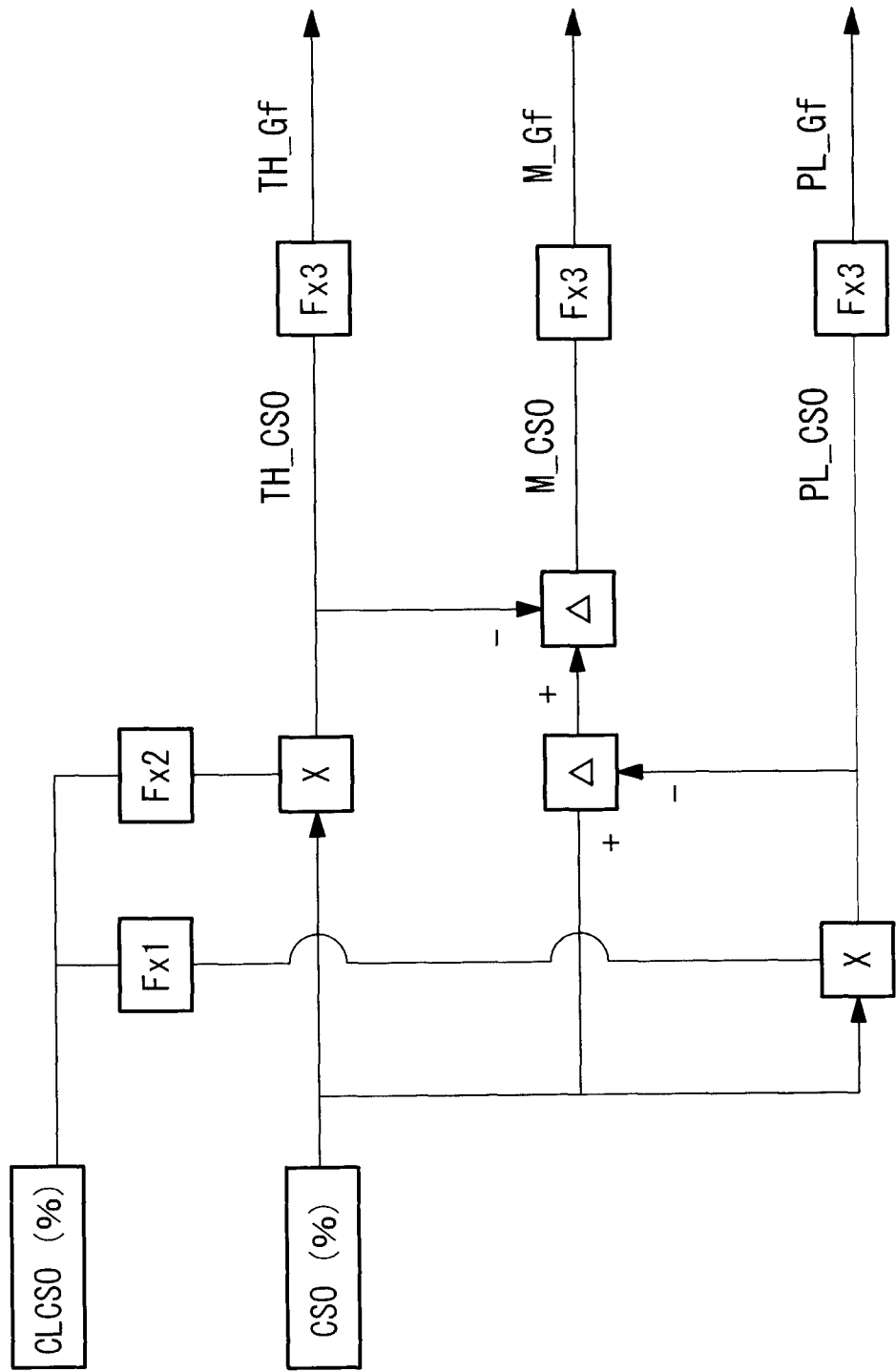
FIG. 5 is a diagram illustrating the fuel-gas supply control logic of the control unit in FIG. 3.

Specifically, as shown in FIG. 5, PL_CSO is calculated using CSO, CLCSO, and a function Fx1 of PL_CSO, which are set so that a predetermined pilot ratio is obtained.

Furthermore, TH_CSO is calculated using CSO, CLCSO, and a function Fx2 of TH_CSO, which are set so that a predetermined top-hat ratio is obtained.

Furthermore, M_CSO is calculated on the basis of the following calculation expression:

$$M\_CSO = CSO - PL\_CSO - TH\_CSO$$

Then, the calculating section 21 calculates fuel-flow-rate command values PL_Gf, M_Gf, and TH_Gf for the fuel supply lines 10P, 10M, and 10T from the calculated PL_CSO, M_CSO, and TH_CSO, respectively (step S3).

That is, fuel-flow-rate command values expressed by actual fuel flow rates (kg/s) are calculated from PL_CSO, M_CSO, and TH_CSO expressed as a percentage (%) relative to CSO.

Figure 9:
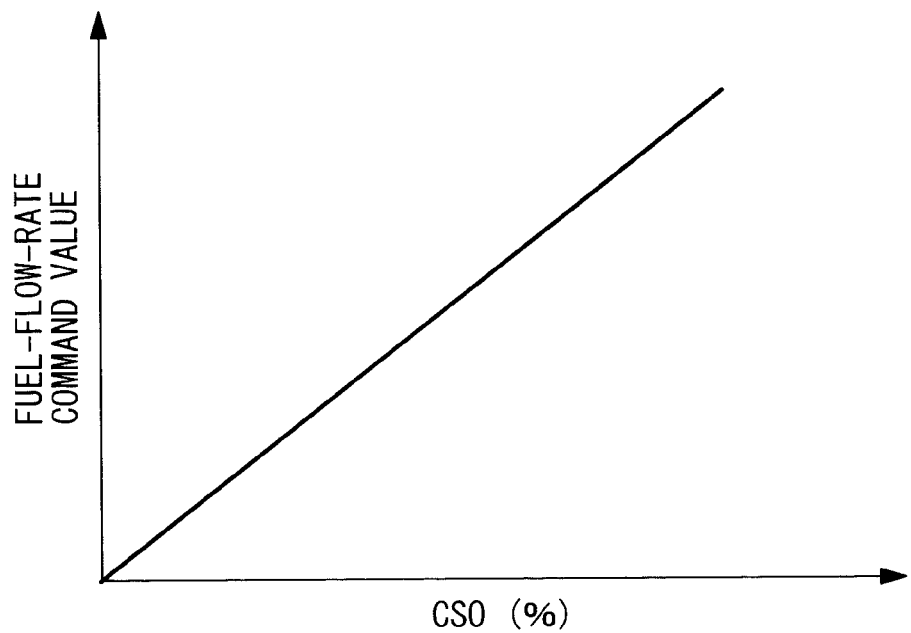
FIG. 9 is a graph illustrating the relationship between CSO and a fuel-flow-rate command value Gf.

FIG. 9 is a graph illustrating the relationship between CSO and the fuel-flow-rate command value Gf.

Note that FIG. 9 shows only the relationship between CSO and Gf for ease of explanation.

Specifically, the calculating section 21 calculates fuel-flow-rate command values PL_Gf, M_Gf, and TH_Gf required for the individual fuel supply lines from PL_CSO, M_CSO, and TH_CSO on the basis of the relationship shown in FIG. 9.

In this embodiment, the method for calculating the fuel-flow-rate command values will be described as applied to an example in which PL_Gf, M_Gf, and TH_Gf are calculated from a function Fx3 that is stored in advance in the calculating section 21.

Next, the calculating section 21 calculates the values of PL_Cv, M_Cv, and TH_Cv, which are the required flow-rate coefficients for the corresponding flow-rate regulating valves 13P, 13M, and 13T, on the basis of PL_Gf, M_Gf, and TH_Gf (step S4).

Here, a case where the flow of fuel gas in the pilot flow-rate regulating valve 13P, the main flow-rate regulating valve 13M, and the top-hat flow-rate regulating valve 13T is a non-choked flow will be described.

Figure 6:
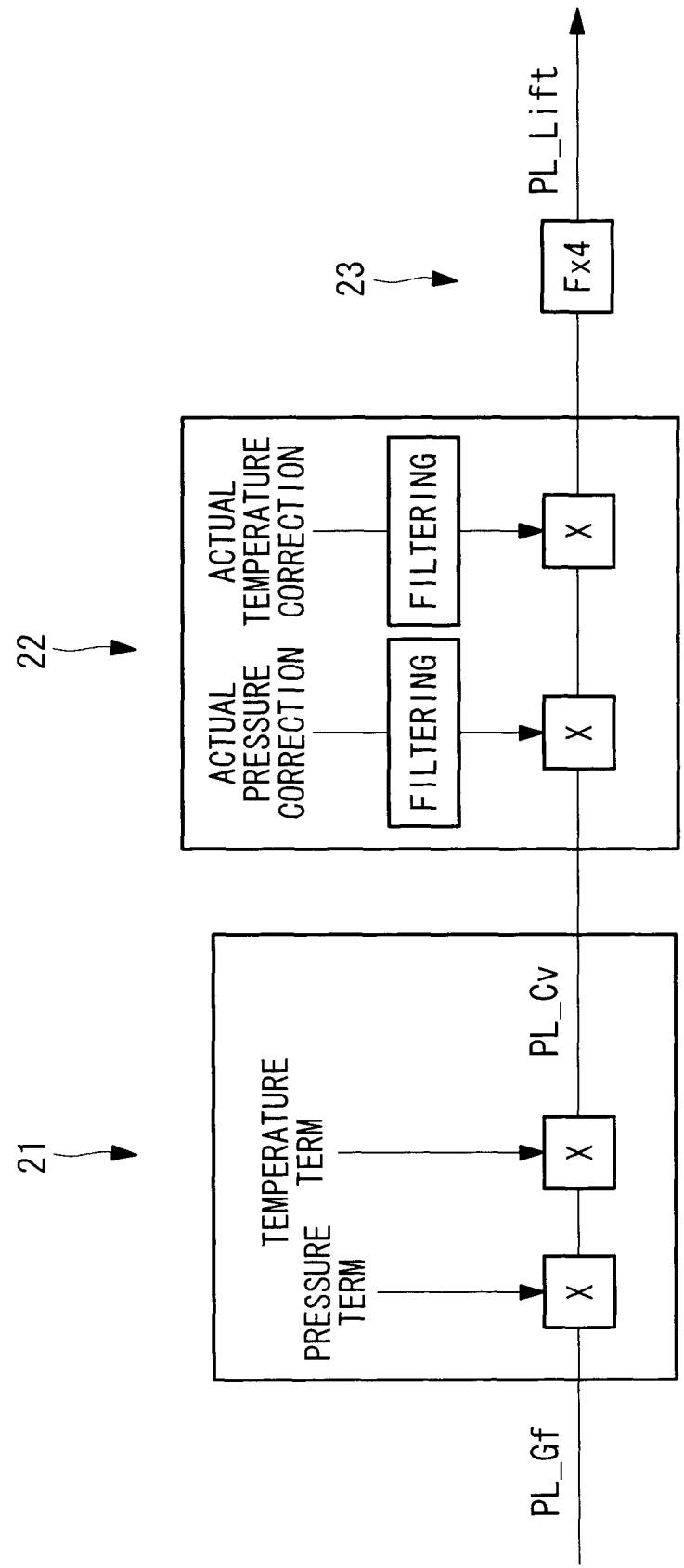
FIG. 6 is a diagram illustrating the fuel-gas supply control logic of the control unit in FIG. 3.

For example, a description will be given for the pilot fuel supply line 10P. As shown in FIG. 6, the calculating section 21 calculates the value of PL_Cv on the basis of PL_Gf, a pressure term, and a temperature term.

Here, the pressure term is a function based on the actual measured value P1$m$ of the pressure of fuel gas upstream of the pilot flow-rate regulating valve 13P, measured by the common pressure sensor 12C, and a set value (predetermined pressure) P3 of the casing internal pressure, which is the internal pressure of the casing in which the combustor 3 is disposed.

The temperature term is a function based on a set value (predetermined temperature) T of the fuel gas temperature.

The set value P3 of the casing internal pressure is a set value obtained using a predetermined relational expression on the basis of CSO calculated on the basis of the load command value of the gas-turbine power generating plant 1, the angle α of an inlet guide vane (IGV) provided at the compressor 2, and the temperature Ta of the atmosphere taken into the compressor 2.

Figure 10:
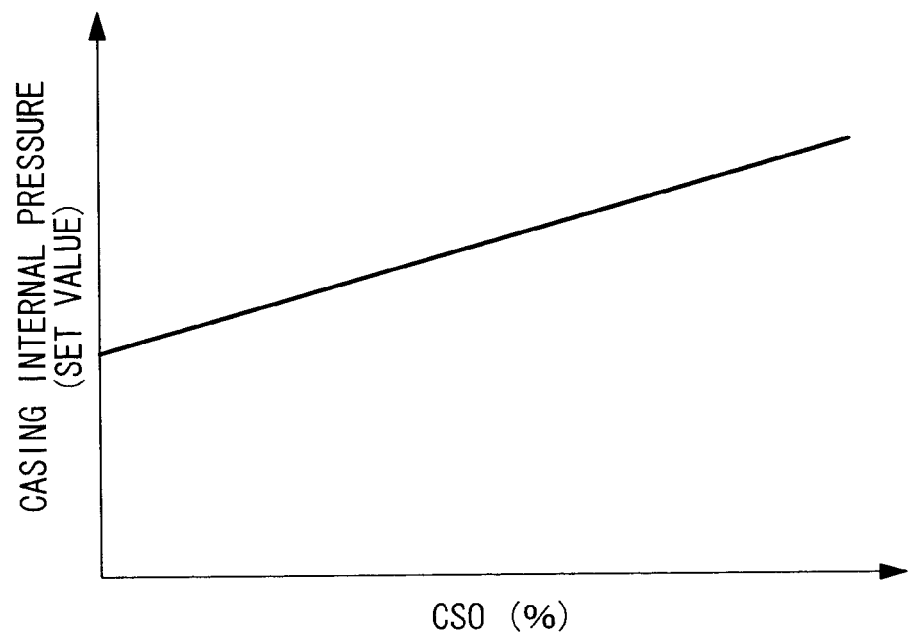
FIG. 10 is a graph illustrating the relationship between CSO and the casing internal pressure setting.

FIG. 10 is a graph illustrating the relationship between CSO and the casing internal pressure setting.

Specifically, first, the set value P3 of the casing internal pressure relative to calculated CSO is calculated on the basis of the relational expression for CSO and the casing internal pressure setting, shown in the graph of FIG. 10.

Figure 11:
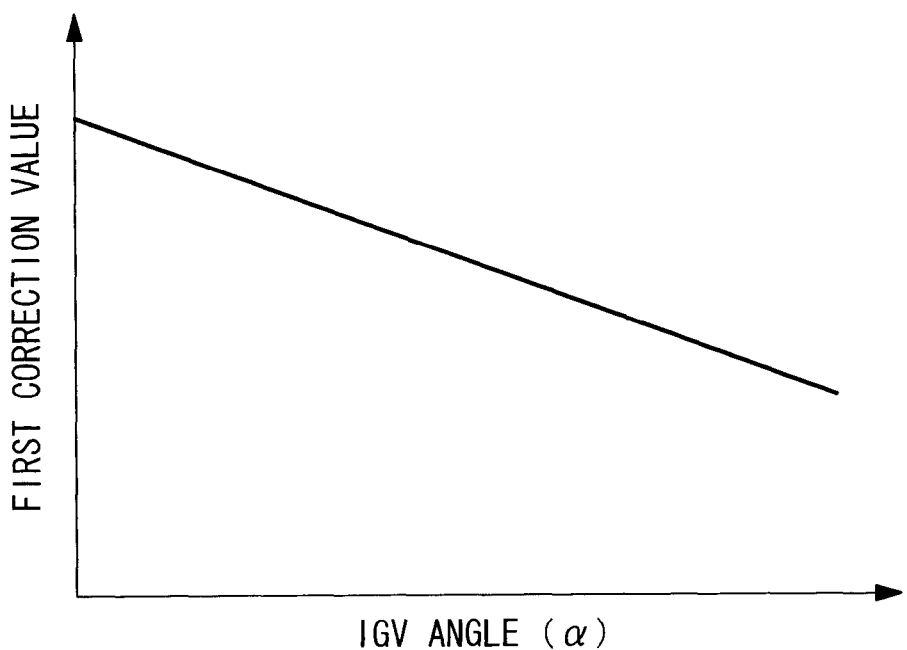
FIG. 11 is a graph illustrating the relationship between the angle α of an IGV and a first correction value.

FIG. 11 is a graph illustrating the relationship between the angle α of the IGV and a first correction value.

Next, the first correction value at angle α during the operation of the gas-turbine power generating plant 1 is calculated on the basis of the relational expression for the angle α of the IGV and the first correction value shown in the graph of FIG. 11, and the set value P3 of the casing internal pressure is corrected on the basis of the calculated first correction value.

Figure 12:
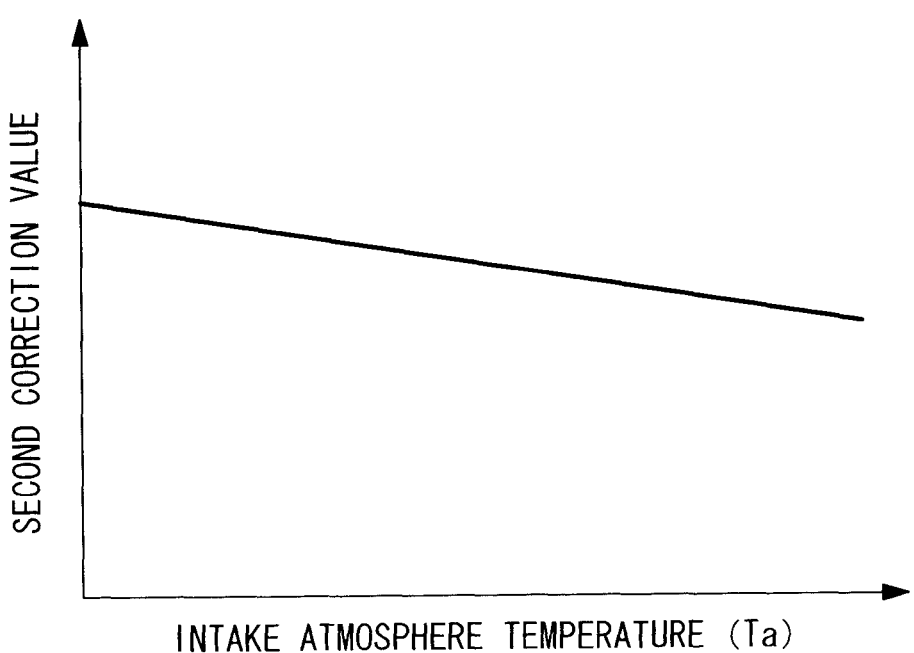
FIG. 12 is a graph illustrating the relationship between the atmosphere temperature Ta and a second correction value.

FIG. 12 is a graph illustrating the relationship between the temperature Ta of the atmosphere and a second correction value.

Furthermore, the second correction value relative to the temperature Ta of the atmosphere taken into the compressor 2 is calculated on the basis of the relational expression for the temperature Ta of the atmosphere and the second correction value shown in the graph of FIG. 12, and the set value P3 of the casing internal pressure is further corrected on the basis of the calculated second correction value.

Thus, the corrected set value P3 of the casing internal pressure is used to calculate the pressure term described above.

Figure 7:
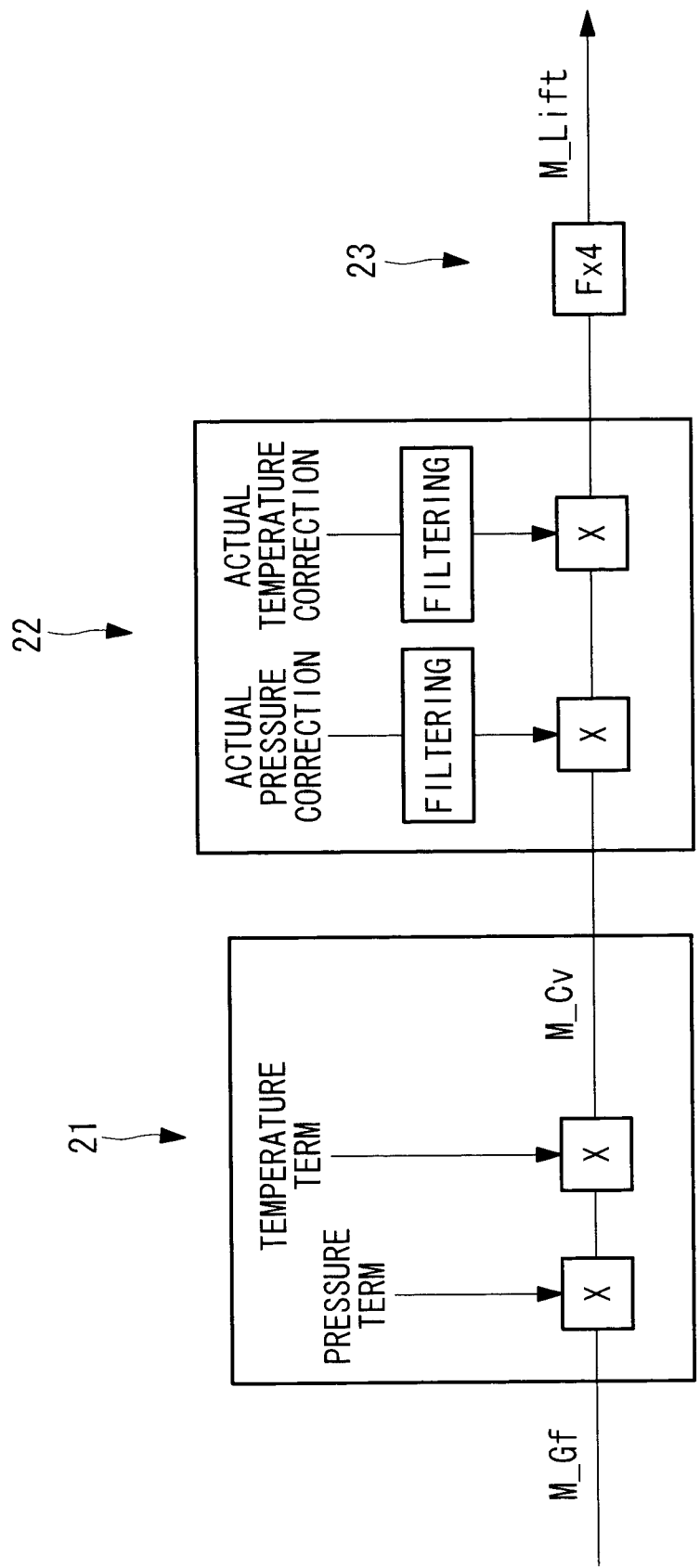
FIG. 7 is a diagram illustrating the fuel-gas supply control logic of the control unit in FIG. 3.
Figure 8:
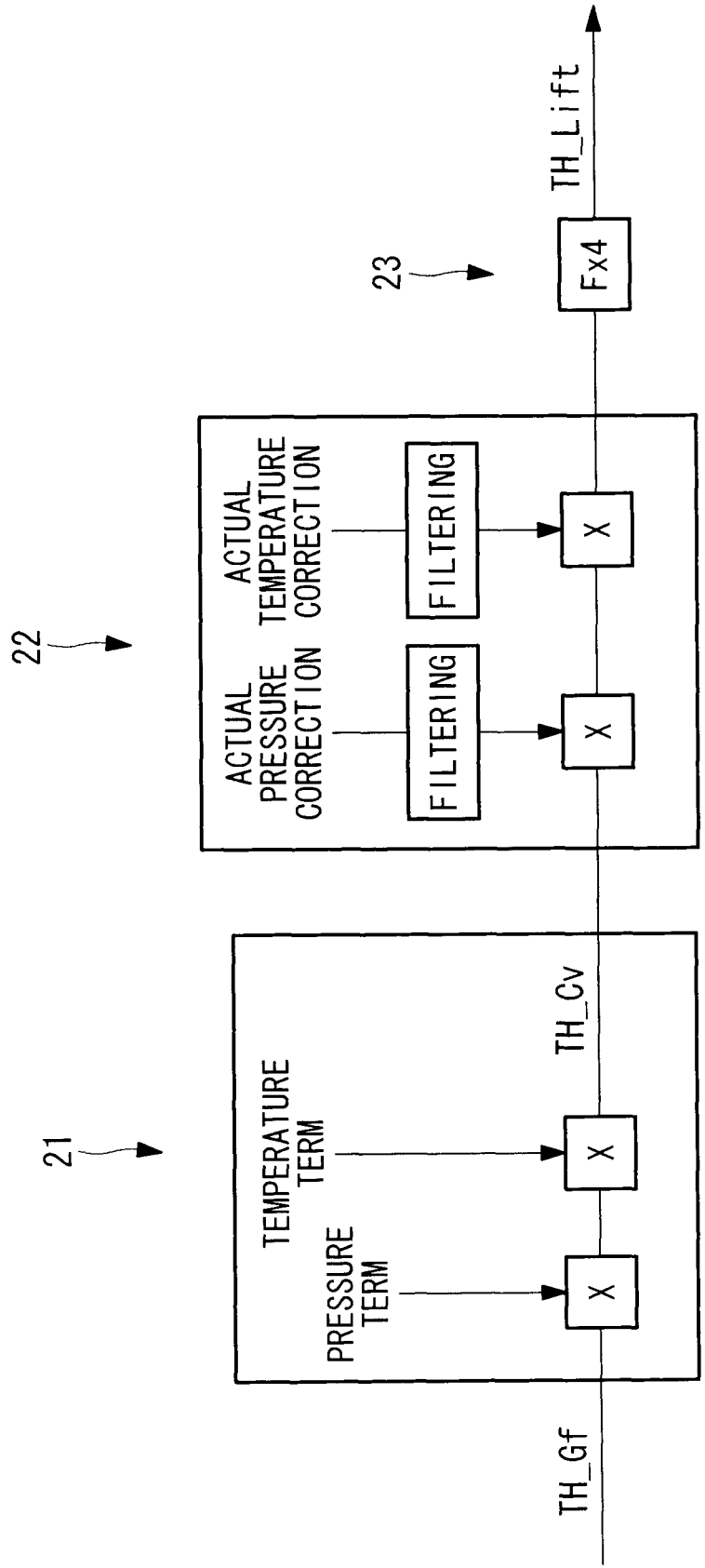
FIG. 8 is a diagram illustrating the fuel-gas supply control logic of the control unit in FIG. 3.

Also for the main fuel supply line 10M and the top-hat fuel supply line 10T, the values of M_Cv and TH_Cv are calculated by the calculating section 21, as shown in FIGS. 7 and 8.

The calculated values of PL_Cv, M_Cv, and TH_Cv are input to the correcting section 22, and the values of PL_Cv, M_Cv, and TH_Cv are corrected by the correcting section 22 (step S5).

For example, a description will be given for the pilot fuel supply line 10P. As shown in FIG. 6, the correcting section 22 corrects the value of PL_Cv on the basis of actual pressure correction and actual temperature correction.

Here, the actual pressure correction is a function based on the actual measured value $P1m$ of the pressure of fuel gas upstream of the pilot flow-rate regulating valve 13P, measured by the common pressure sensor 12C, a set value (predetermined pressure) P1 thereof, the actual measured value $P3m$ of the casing internal pressure, and the set value P3 thereof.

The actual temperature correction is a function based on a measured value t1 of the fuel gas temperature measured by the common temperature sensor 13C and a set value T thereof.

Furthermore, the actual pressure correction and the actual temperature correction can also be filtered when used to correct the value of PL_Cv.

The filtering causes a first-order lag in the values of actual pressure correction and actual temperature correction relative to changes in the fuel gas pressure and temperature. Therefore, the value of the corrected PL_Cv decreases its followability to changes in the fuel gas pressure and temperature and becomes to a stable value.

Also for the main fuel supply line 10M and the top-hat fuel supply line 10T, the values of M_Cv and TH_Cv are corrected by the correcting section 22, as shown in FIGS. 7 and 8.

The corrected PL_Cv, M_Cv, and TH_Cv are input to the valve control section 23, and in the valve control section 23, PL_Lift, M_Lift, and TH_Lift, which are the degrees-of-opening of the corresponding flow-rate regulating valves, are calculated on the basis of a function Fx4 stored in advance (step S6).

For example, a description will be given concerning the pilot fuel supply line 10P. As shown in FIG. 6, the valve control section 23 calculates PL_Lift on the basis of the value of PL_Cv and the characteristics of the pilot flow-rate regulating valve 13P.

The calculated PL_Lift is output from the valve control section 23 to the pilot flow-rate regulating valve 13P, and thus, the degree-of-opening of the pilot flow-rate regulating valve 13P is controlled.

Also for the main fuel supply line 10M and the top-hat fuel supply line 10T, the values of M_Lift and TH_Lift are calculated by the valve control section 23, and thus, the degree-of-opening of the main flow-rate regulating valve 13M and the degree-of-opening of the top-hat flow-rate regulating valve 13T are controlled, as shown in FIGS. 7 and 8.

With the above configuration, the flow rate of fuel to be supplied to one of the pilot nozzles 11P, the main nozzles 11M, and the top hat nozzles 11T, for example, the pilot nozzles 11P, is regulated by controlling the degree-of-opening (PL_Lift) of the pilot flow-rate regulating valve 13P corresponding to the pilot nozzles 11P. Therefore, the responsiveness of the fuel supply unit 5 of this embodiment to an input for changing the flow rate of fuel to be supplied to the pilot nozzles 11P is higher than that of the invention disclosed in PTL 1.

Specifically, the fuel supply unit 5 of this embodiment can respond to an input for changing the fuel flow rate, described above, without using a pressure regulating valve or the like having lower responsiveness than the flow-rate regulating valve.

Thus, the fuel supply unit 5 of this embodiment can respond more quickly to the input for changing the fuel flow rate, described above, as compared with the invention of PTL 1, which responds thereto using a pressure regulating valve and a flow-rate regulating valve.

On the other hand, since the fuel supply unit 5 of this embodiment is not provided with a pressure regulating valve, the number of pressure regulating valves can be reduced as compared with the invention of PTL 1, in which the main fuel supply line 10M, the pilot fuel supply line 10P, and the top-hat fuel supply line 10T are each provided with a pressure regulating valve.

This can reduce the size of the fuel supply unit 5 of this embodiment, which makes it possible to reduce the space necessary for installation. This makes it easy to install the fuel supply unit 5 in the gas-turbine power generating plant 1, thus facilitating manufacturing and reducing the manufacturing costs.

Furthermore, since there is no need to take into account pressure loss of fuel gas in a pressure regulating valve, the pressure of fuel gas to be supplied to the combustor 3 can be kept low as compared with the invention of PTL 1.

This allows a boosting capacity required for the supply unit 11C that supplies fuel gas to be kept low, thus reducing the manufacturing costs of the fuel supply unit 5 and the gas-turbine power generating plant 1.

For example, since the fuel gas pressure $P1m$ measured at the upstream side and the fuel gas pressure at the downstream side, which is a function of the set value P3 etc., are used to control the degree-of-opening (PL_Lift) of the pilot flow-rate regulating valve 13P corresponding to the pilot nozzles 11P, control is possible in both the choked region and the non-choked region.

On the other hand, since the values of the required flow-rate coefficients (PL_Cv, M_Cv, and TH_Cv) are calculated on the basis of the upstream-side fuel gas pressure $P1m$ measured by the common pressure sensor 12C, even if the pressure of fuel gas supplied to the common line 10C, in other words, the pressure of fuel gas upstream of the flow-rate regulating valves 13P, 13M, and 13T, changes, the values of the required flow-rate coefficients (PL_Cv, M_Cv, and TH_Cv) are calculated on the basis of the pressure of the fuel gas after the change. The degrees-of-opening (PL_Lift, M_Lift, and TH_Lift) of the flow-rate regulating valves can be controlled on the basis of the required flow-rate coefficients.

Furthermore, since the pressure term, which is a function of the set value P3 of the casing internal pressure, and the temperature term, which is a function of the set value T of the fuel gas temperature, are used to calculate the values of the required flow-rate coefficients (PL_Cv, M_Cv, and TH_Cv), the influence of changes in the measured fuel gas pressure on the calculated required flow-rate coefficients can be suppressed as compared with a method using a pressure term that is a function of only an actually measured fuel gas pressure at the downstream side and a temperature term that is a function of only an actually measured fuel gas temperature.

The influence of the measured fuel gas pressure on the fuel distribution ratio among the pilot nozzles 11P, the main nozzles 11M, and the top hat nozzles 11T, that is, the fuel distribution ratio among the pilot fuel supply line 10P, the main fuel supply line 10M, and the top-hat fuel supply line 10T, can be suppressed as compared with the method using only the actually measured downstream-side fuel gas pressure.

For example, if at least one of a plurality of actually measured downstream-side fuel gas pressures corresponding to the pilot fuel supply line 10P, the main fuel supply line 10M, and the top-hat fuel supply line 10T is an inaccurate fuel gas pressure due to a fault or the like in the measuring instrument, the values of the required flow-rate coefficients (PL_Cv, M_Cv, and TH_Cv) are calculated on the basis of the inaccurate fuel gas pressure, thus influencing the fuel distribution ratio among the pilot fuel supply line 10P, the main fuel supply line 10M, and the top-hat fuel supply line 10T.

However, the influence of a fault or the like in the measuring instrument can be eliminated by calculating the values of the required flow-rate coefficients (PL_Cv, M_Cv, and TH_Cv) by using the downstream-side fuel gas pressure, which is a function of the set value P3 of the casing internal pressure, thus suppressing the influence on the fuel distribution ratio among the pilot fuel supply line 10P, the main fuel supply line 10M, and the top-hat fuel supply line 10T.

Furthermore, the values of the required flow-rate coefficients (PL_Cv, M_Cv, and TH_Cv) can be calculated by calculating downstream-side fuel gas pressures corresponding to the pilot nozzles 11P, the main nozzles 11M, and the top hat nozzles 11T by using the set value P3 of the casing internal pressure as a common parameter. This allows fuel distribution among the pilot nozzles 11P, the main nozzles 11M, and the top hat nozzles 11T, that is, fuel distribution among the pilot fuel supply line 10P, the main fuel supply line 10M, and the top-hat fuel supply line 10T, to be suitably performed as compared with a method that does not use the set value P3 of the casing internal pressure.

Furthermore, in the case where set values (different set values) of the downstream-side fuel gas pressure are used individually for the pilot nozzles 11P, the main nozzles 11M, and the top hat nozzles 11T, when the differential pressure between the downstream-side fuel pressure, described above, and an actual downstream-side fuel pressure increases, it is necessary to change the set values of the individual downstream-side fuel gas pressures, thus making it difficult to change them. In particular, it is difficult to change them at the site where the gas-turbine power generating plant 1 is installed.

In contrast, the fuel supply unit 5 of this embodiment has only to change only one set value P3 of one casing internal pressure, thus making it easy to cope with this issue.

Since the correcting section 22 is provided, deviations included in the values of the required flow-rate coefficients (PL_Cv, M_Cv, and TH_Cv) calculated by the calculating section 21 can be corrected using the actual measured value P3m of the casing internal pressure and the actual measured value t of the fuel gas temperature.

Note that the values of the required flow-rate coefficients (PL_Cv, M_Cv, and TH_Cv) calculated by the calculating section 21 may be corrected by the correcting section 22, as in the above embodiment, or the values of the required flow-rate coefficients (PL_Cv, M_Cv, and TH_Cv) calculated by the calculating section 21 may also be directly output to the valve control section 23 without correction; there is no particular limitation.

Second Embodiment

A second embodiment of the present invention will be described hereinbelow with reference to FIGS. 13 to 16.

Although the basic configuration of a gas-turbine power generating plant of this embodiment is the same as that of the first embodiment, the second embodiment differs from the first embodiment in that a common pressure regulating valve is provided in the common line. Accordingly, in this embodiment, only the vicinity of the common line will be described using FIGS. 13 to 16, and descriptions of the other components etc. will be omitted.

Figure 13:
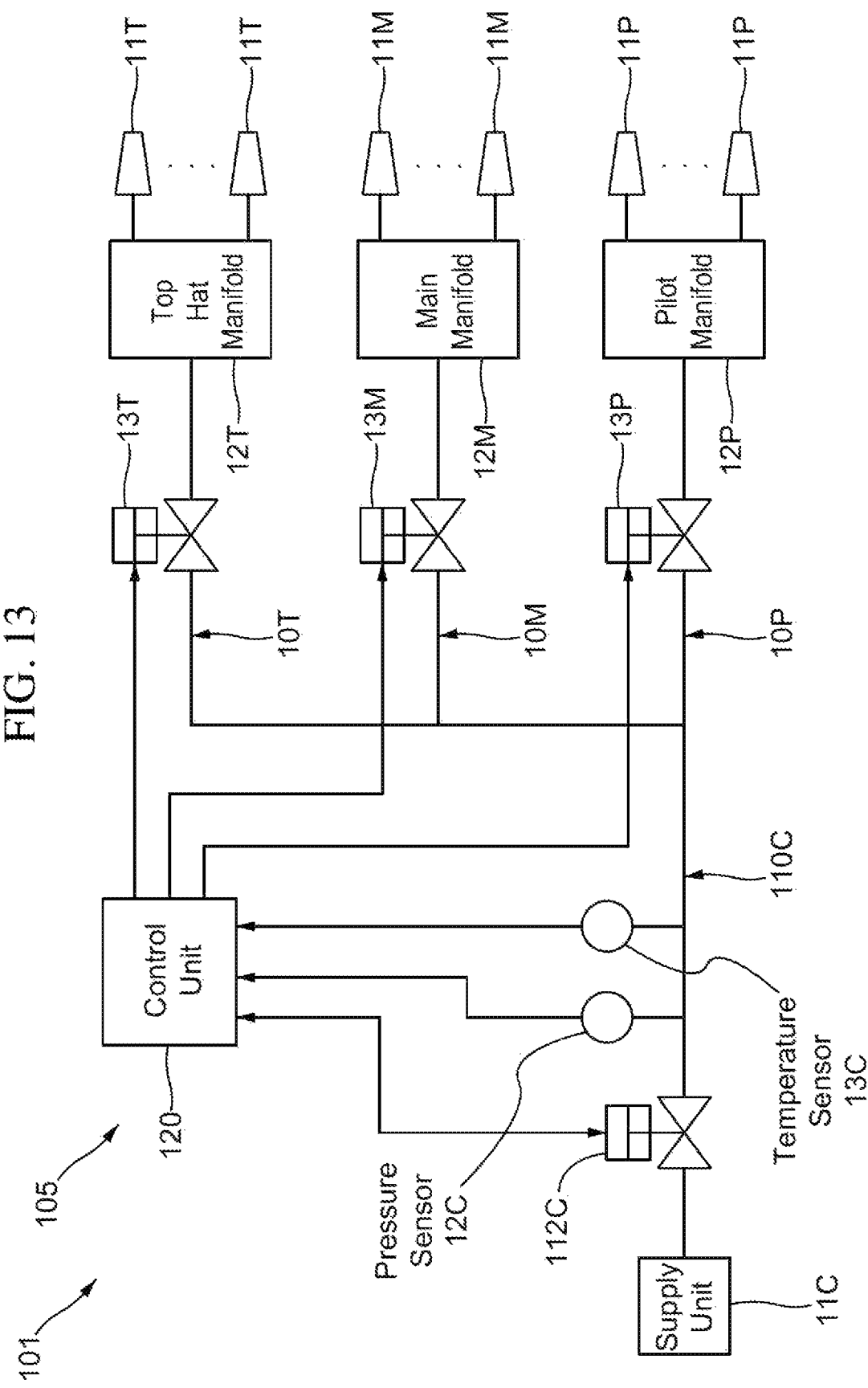
FIG. 13 is a schematic diagram illustrating the flow of fuel gas in a fuel supply unit and a combustor in a gas-turbine power generating plant according to a second embodiment of the present invention.

FIG. 13 is a schematic diagram illustrating the flow of fuel gas in a fuel supply unit and a combustor in the gas-turbine power generating plant according to this embodiment.

The same components as those of the first embodiment are given the same reference signs, and descriptions thereof will be omitted.

As shown in FIG. 13, a fuel supply unit 105 of a gas-turbine power generating plant 101 of this embodiment supplies fuel gas to the combustor 3. Specifically, the fuel supply unit 105 supplies fuel gas to the pilot nozzles 11P, the main nozzles 11M, and the top hat nozzles 11T provided in the combustor 3.

The fuel supply unit 105 is mainly provided with a common line 110C, the main fuel supply line 10M, the pilot fuel supply line 10P, the top-hat fuel supply line 10T, and a control unit 120.

As shown in FIG. 13, the common line 110C is a line that supplies fuel gas to the pilot fuel supply line 10P, the main fuel supply line 10M, and the top-hat fuel supply line 10T.

One end of the common line 110C is connected to the supply unit 11C that supplies fuel gas, and the other end is connected to the pilot fuel supply line 10P, the main fuel supply line 10M, and the top-hat fuel supply line 10T.

Furthermore, the common line 110C is provided with the common pressure sensor 12C that measures the pressure of the fuel gas, the common temperature sensor 13C that measures the temperature of the fuel gas, and a common pressure regulating valve (pressure regulating section) 114C that regulates the pressure of the fuel gas.

The common pressure regulating valve 114C regulates the pressure of a fuel gas flow upstream of the pilot flow-rate regulating valve 13P, the main flow-rate regulating valve 13M, and the top-hat flow-rate regulating valve 13T to a predetermined set value P1.

For example, the common pressure regulating valve 114C is controlled by the control unit 120 to regulate the pressure of the upstream-side fuel gas, described above, to the set value P1 on the basis of the value of the fuel gas pressure measured by the common pressure sensor 12C.

Figure 14:
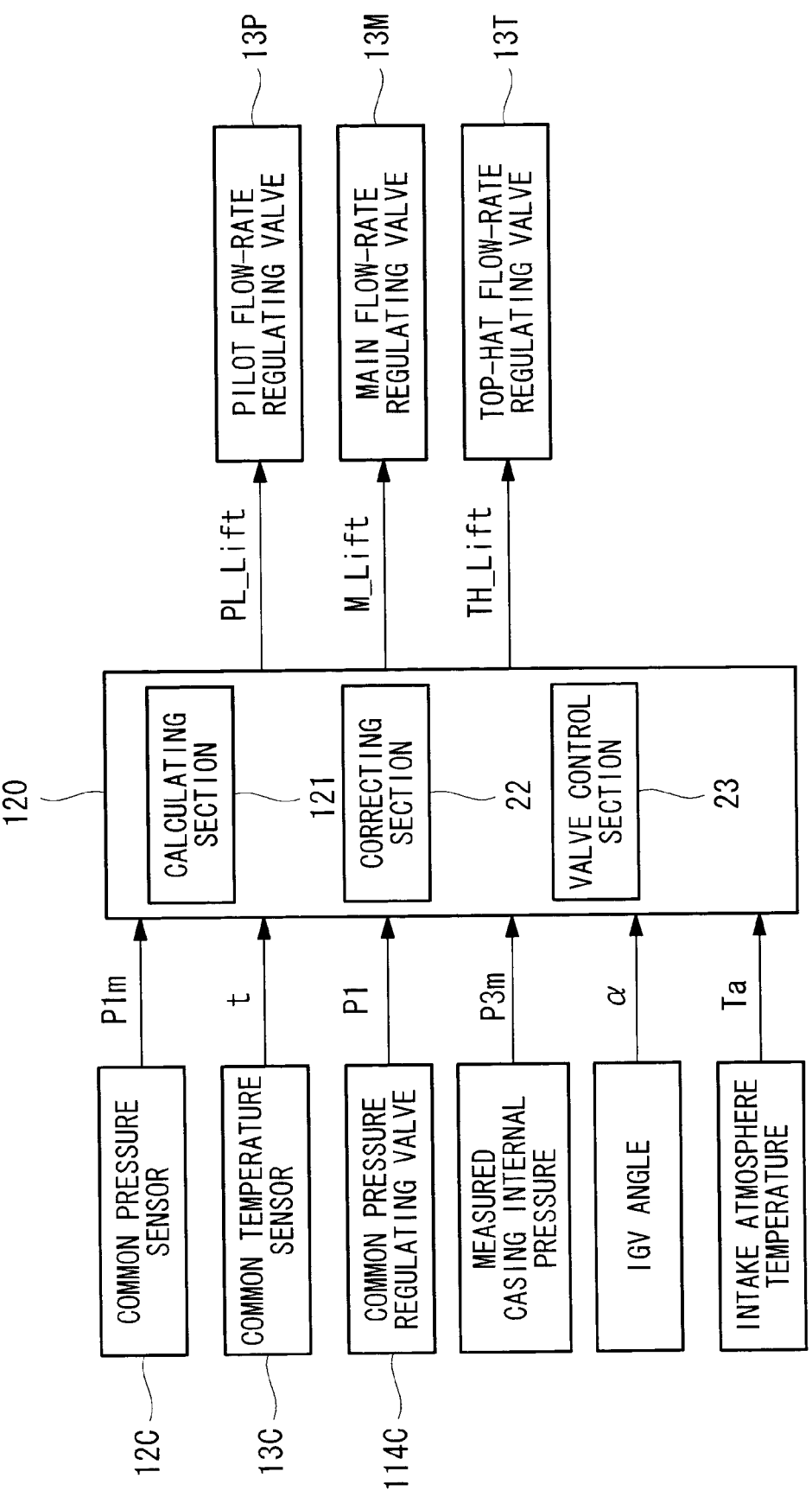
FIG. 14 is a block diagram illustrating the configuration of a control section in FIG. 13.

FIG. 14 is a block diagram illustrating the configuration of the control unit in FIG. 13.

As shown in FIGS. 13 and 14, the control unit 120 controls the degrees-of-opening of the pilot flow-rate regulating valve 13P, the main flow-rate regulating valve 13M, and the top-hat flow-rate regulating valve 13T.

As shown in FIG. 14, the control unit 120 is provided with a calculating section 121, the correcting section 22, and the valve control section 23.

The details of control performed by the control unit 120 will be described below.

The calculating section 121 calculates CSO on the basis of a load command and calculates PL_CSO, M_CSO, and TH_CSO.

Furthermore, the calculating section 121 calculates PL_Cv, M_Cv, and TH_Cv.

Next, fuel-gas supply control performed by the control unit 120, which is a feature of this embodiment, will be described with reference to FIG. 15 and so on. Since the general operation of the gas-turbine power generating plant 101 of this embodiment is similar to that of the first embodiment, a description thereof will be omitted.

Figure 15:
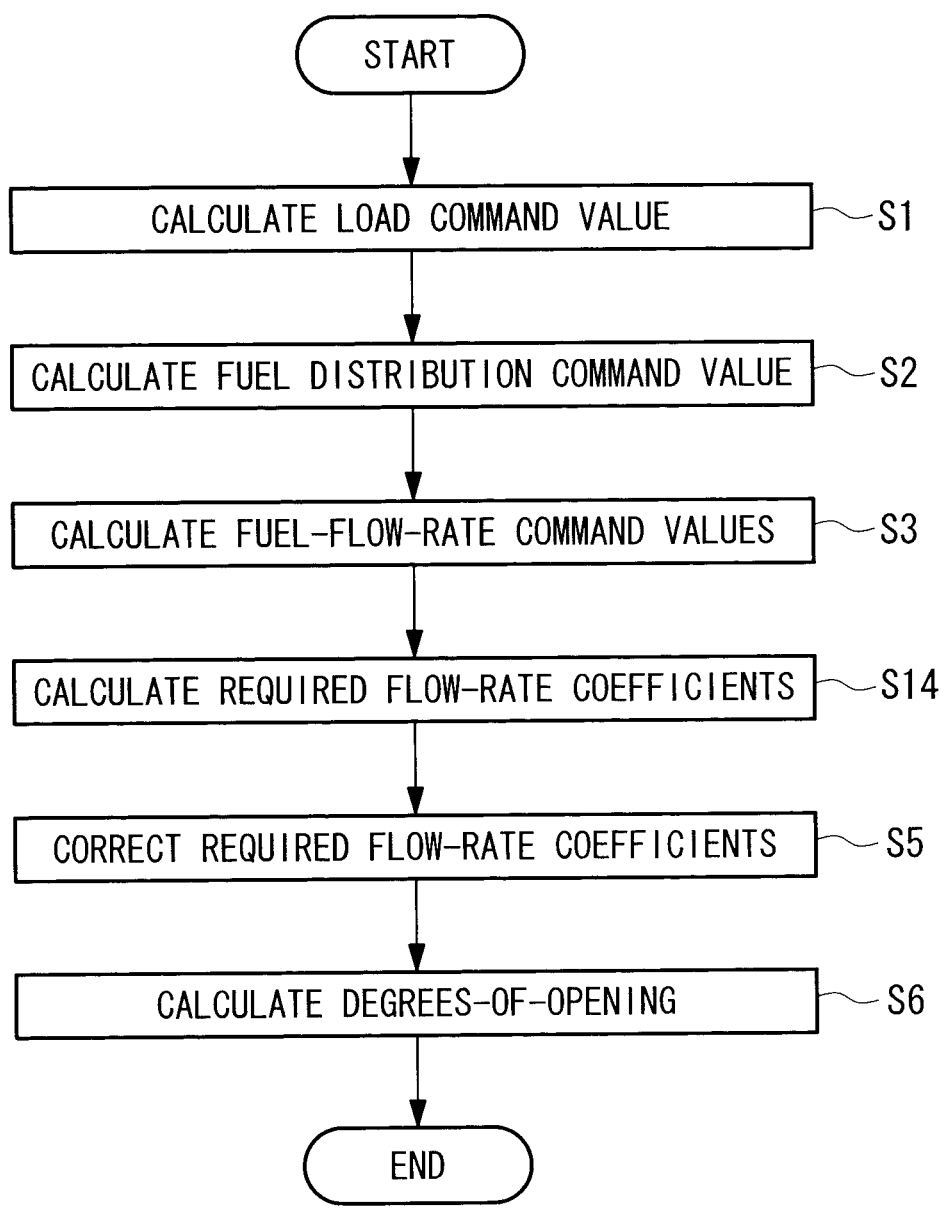
FIG. 15 is a flowchart illustrating the fuel-gas supply control method of the control unit in FIG. 13.

FIG. 15 is a flowchart illustrating the fuel-gas supply control method of the control unit in FIG. 13.

Here, calculation of the values of the required flow-rate coefficients PL_Cv, M_Cv, and TH_Cv, which is a feature of the fuel-gas supply control performed by the control unit 120 (step S14), will be described. In other words, since the steps from calculation of the load command value (step S1) to calculation of the fuel-flow-rate command values (step S3), correction of the required flow-rate coefficients (step S5), and calculation of the degrees-of-opening (step S6) are the same as those of the first embodiment, descriptions thereof will be omitted.

For example, a description will be given for the pilot fuel supply line 10P. The calculating section 121 calculates the value of PL_Cv on the basis of PL_Gf, a pressure term, and a temperature term.

The temperature term is a function based on the set value T of the fuel gas temperature, as in the first embodiment.

The pressure term is a function based on the set value (preset pressure) P1 of the fuel gas pressure upstream of the pilot flow-rate regulating valve 13P and a set value P3 of the casing internal pressure.

The set value P1 of the fuel gas pressure is a set value of the fuel gas pressure regulated by the common pressure regulating valve 114C.

Also for the main fuel supply line 10M and the top-hat fuel supply line 10T, the values of M_Cv and TH_Cv are calculated by the calculating section 121.

Figure 16:
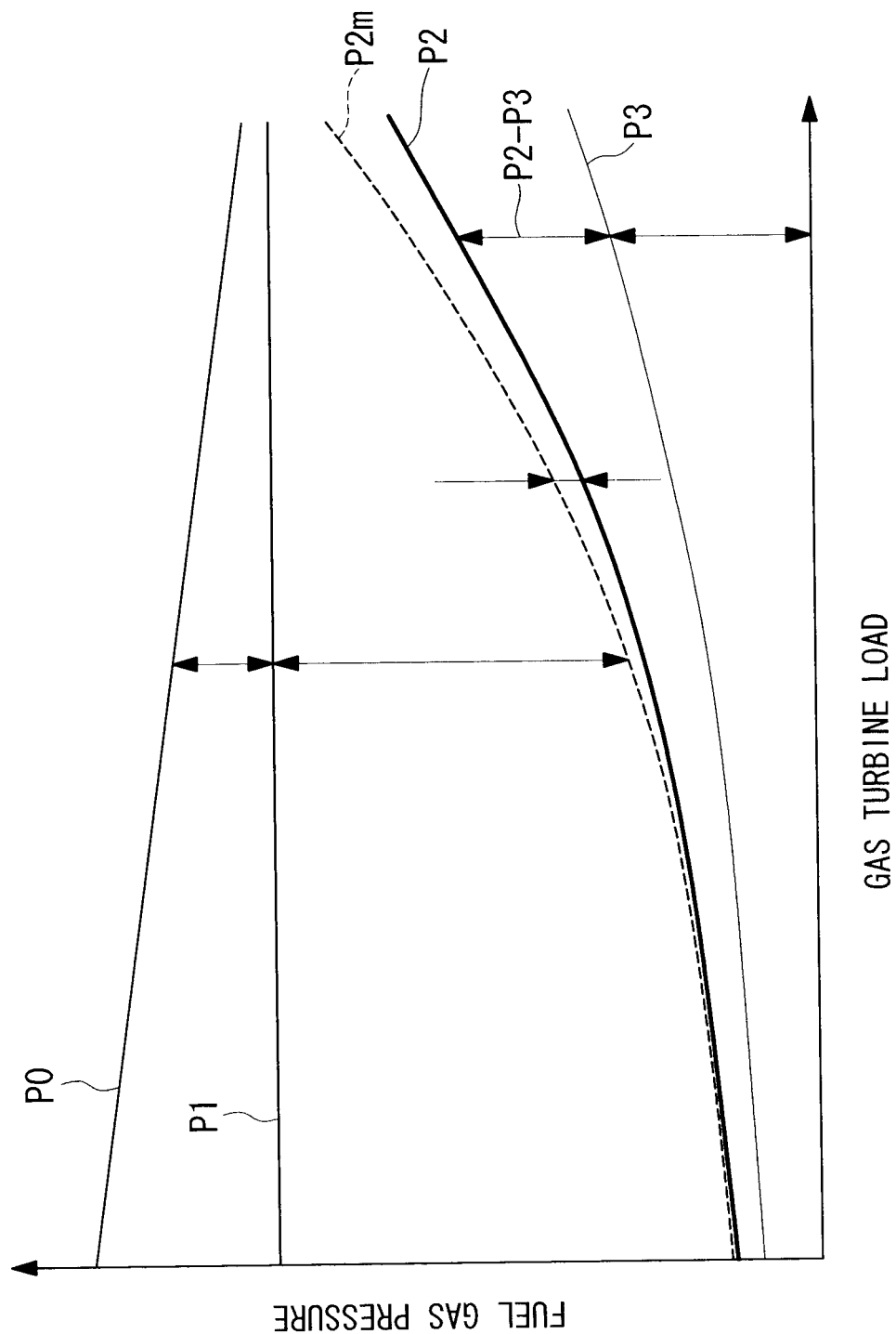
FIG. 16 is a graph illustrating changes in fuel gas pressure at individual parts relative to a gas turbine load.

FIG. 16 is a graph illustrating changes in fuel gas pressure at the individual parts relative to the gas turbine load.

This will be described from the upstream side of the fuel gas flow. Since the pressure loss of the fuel supply line increases as the gas turbine load increases, as shown in FIG. 16, the pressure P0 of fuel gas supplied from the supply unit 11C decreases gradually. The pressure of the fuel gas supplied from the supply unit 11C is regulated to a substantially fixed set value P1 by the common pressure regulating valve 114C. In other words, the differential pressure between the pressures P0 and P1 is a differential pressure at the common pressure regulating valve 114C.

On the other hand, the set value P3 of the pressure in the casing in which the combustor 3 is disposed increases gradually as the gas turbine load increases, as shown in FIG. 16. Furthermore, the pressure loss P2–P3 at the main nozzles 11M and the top hat nozzles 11T also increases gradually as the gas turbine load increases.

Therefore, the set values P2 of the fuel gas pressures at the main manifold 12M and the top hat manifold 12T, which are calculated from the set value P3 of the casing internal pressure, the pressure loss P2–P3, and so on, also increase gradually as the gas turbine load increases.

Here, since there can be a difference (P2$m$–P2) between the set values P2 at the individual manifolds 12P, 12M, and 12T and actually measured pressure values P2$m$, correction is performed by the correcting section 22 described above.

Furthermore, the differential pressure between the pressures P1 and P2$m$ is a differential pressure at each of the flow-rate regulating valves 13P, 13M, and 13T.

With the above configuration, since the common pressure regulating valve 114C is disposed in the common line 110C that supplies fuel to the main fuel supply line 10M, the pilot fuel supply line 10P, and the top-hat fuel supply line 10T, the common pressure regulating valve 114C is not influenced by changes in the fuel distribution ratio among the main fuel supply line 10M, the pilot fuel supply line 10P, and the top-hat fuel supply line 10T. This can suppress variations in specification required for the common pressure regulating valve 114C, thus making it easy to use common specifications for the common pressure regulating valve 114C.

On the other hand, since the common pressure regulating valve 114C controls the fuel gas pressure upstream of the pilot flow-rate regulating valve 13P, the main flow-rate regulating valve 13M, and the top-hat flow-rate regulating valve 13T to a predetermined value, for example, the fixed set value P1, pressure loss in the common pressure regulating valve 114C can be suppressed as compared with the pressure regulating valve of the invention of PTL 1 in which the differential pressures at the pilot flow-rate regulating valve 13P, the main flow-rate regulating valve 13M, and the top-hat flow-rate regulating valve 13T are maintained constant. Therefore, the pressure of fuel gas to be supplied to the common line 110C and the common pressure regulating valve 114C can be kept low as compared with the invention of PTL 1.

Furthermore, even if the pressure of fuel gas supplied to the common line 110C changes, the pressure is regulated to the predetermined set value P1 by the common pressure regulating valve 114C. Since changes in the pressure of the fuel gas flowing into the pilot flow-rate regulating valve 13P, the main flow-rate regulating valve 13M, and the top-hat flow-rate regulating valve 13T can be suppressed, the pressure difference between the value P1$m$ of the actual upstream-side fuel gas pressure and the set value P1 of the fuel gas pressure used to calculate the required flow-rate coefficients can be reduced.

Since the set value P1 of the fuel gas pressure is used to calculate the values of the required flow-rate coefficients PL_Cv, M_Cv, and TH_Cv, the values of the required flow-rate coefficients PL_Cv, M_Cv, and TH_Cv can be calculated without being influenced by changes in the value P1$m$ of the measured fuel gas pressure, as compared with the method using the value P1$m$ of the actually measured upstream-side fuel gas pressure.

Modification of Second Embodiment

Next, a modification of the second embodiment of the present invention will be described with reference to FIGS. 17 to 22.

Although the basic configuration of a gas-turbine power generating plant of the modification is the same as that of the second embodiment, the modification differs from the second embodiment in that a method for controlling the flow-rate regulating valves during choking is added. Thus, in the modification, only control of the flow-rate regulating valves will be described with reference to FIGS. 17 to 22, and descriptions of the other components etc. will be omitted.

Figure 17:
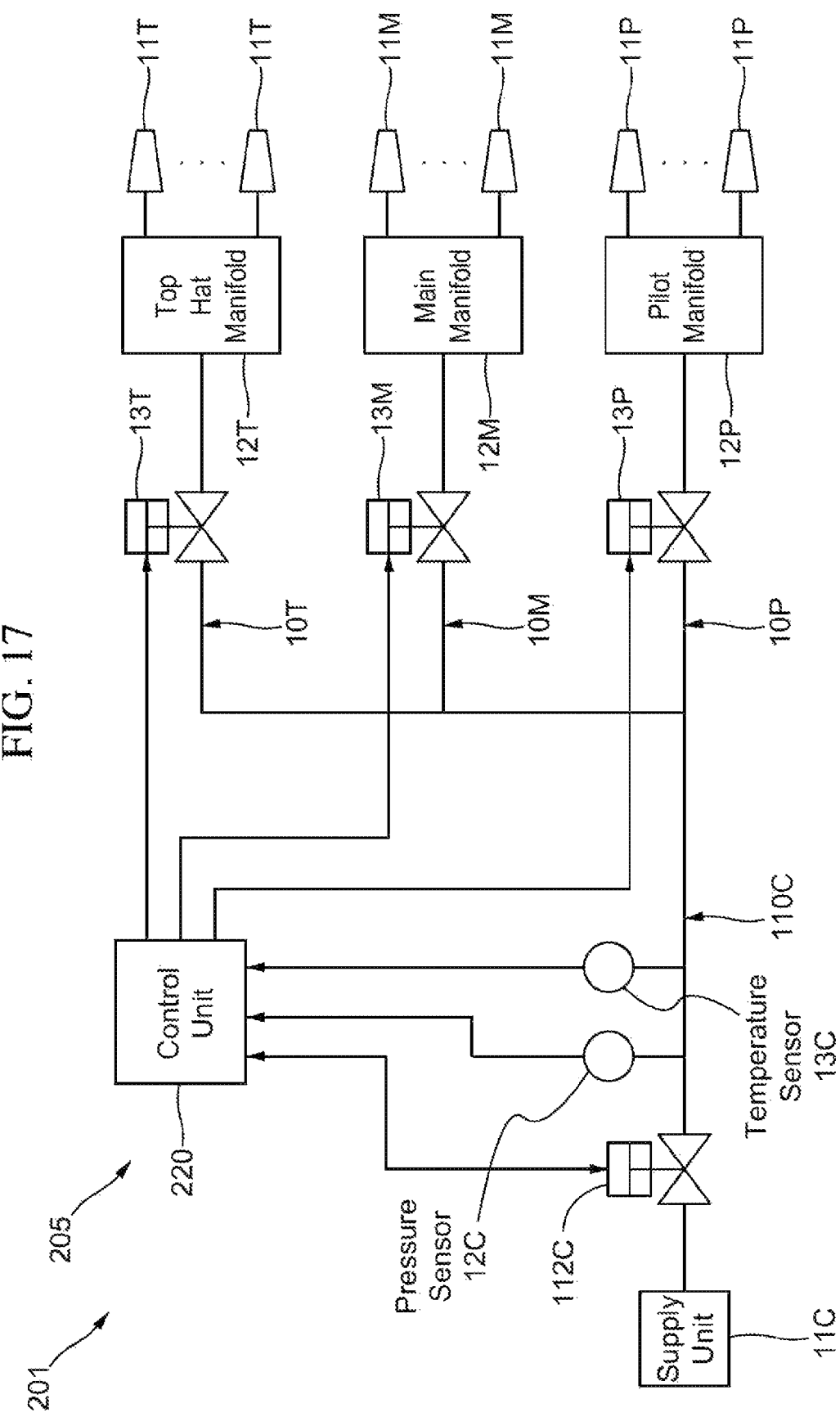
FIG. 17 is a schematic diagram illustrating the flow of fuel gas in a fuel supply unit and a combustor in a gas-turbine power generating plant according to a modification of the second embodiment of the present invention.

FIG. 17 is a schematic diagram illustrating the flow of fuel gas in a fuel supply unit and a combustor in the gas-turbine power generating plant according to this modification.

The same components as those of the second embodiment are given the same reference signs, and descriptions thereof will be omitted.

As shown in FIG. 17, a fuel supply unit 205 of a gas-turbine power generating plant 201 of this embodiment supplies fuel gas to the combustor 3. Specifically, the fuel supply unit 205 supplies fuel gas to the pilot nozzles 11P, the main nozzles 11M, and the top hat nozzles 11T provided in the combustor 3.

The fuel supply unit 205 is mainly provided with a common line 110C, the main fuel supply line 10M, the pilot fuel supply line 10P, the top-hat fuel supply line 10T, and a control unit (fuel-flow-rate control unit) 220.

Figure 18:
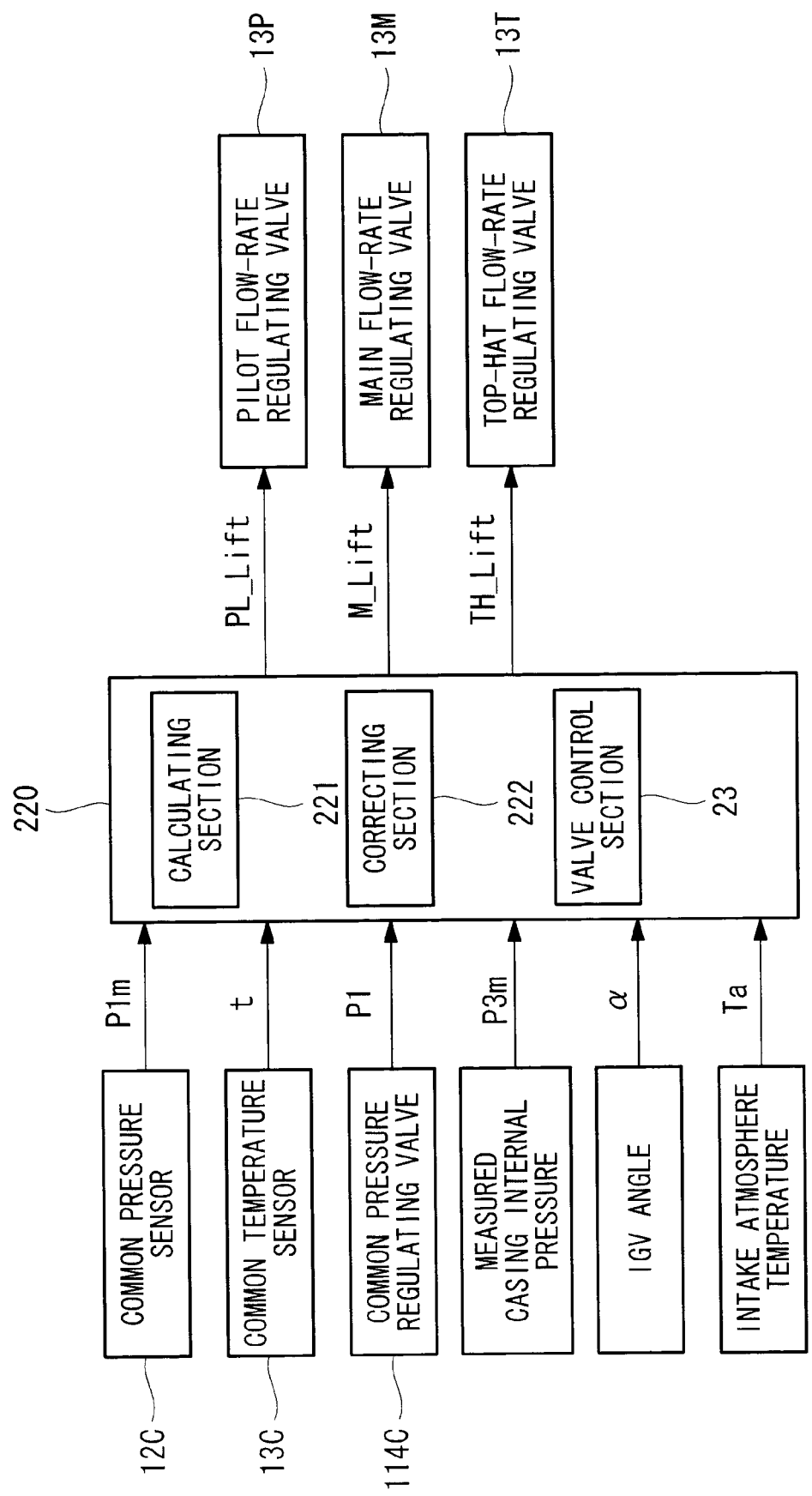
FIG. 18 is a block diagram illustrating the configuration of a control unit in FIG. 17.

FIG. 18 is a block diagram illustrating the configuration of the control unit in FIG. 17.

As shown in FIGS. 17 and 18, the control unit 220 controls the degrees-of-opening of the pilot flow-rate regulating valve 13P, the main flow-rate regulating valve 13M, and the top-hat flow-rate regulating valve 13T.

As shown in FIG. 18, the control unit 220 is provided with a calculating section 221, a correcting section 222, and the valve control section 23.

The details of control performed by the control unit 220 will be described below.

The calculating section 221 calculates PL_Cv, M_Cv, and TH_Cv for the flow of fuel gas in the flow-rate regulating valves 13P, 13M, and 13T for choked and un-choked cases.

The correcting section 222 corrects PL_Cv and so on during choking and non-choking on the basis of actual pressure correction and actual temperature correction and determines whether the flow is choked or not choked by calculating the values of PL_Cv and so on during choking and non-choking and switches between them.

Next, fuel-gas supply control performed by the control unit 220, which is a feature of this embodiment, will be described with reference to FIG. 19 and so on. Since the general operation of the gas-turbine power generating plant 201 of this embodiment is the same as that of the first embodiment, a description thereof will be omitted.

Figure 19:
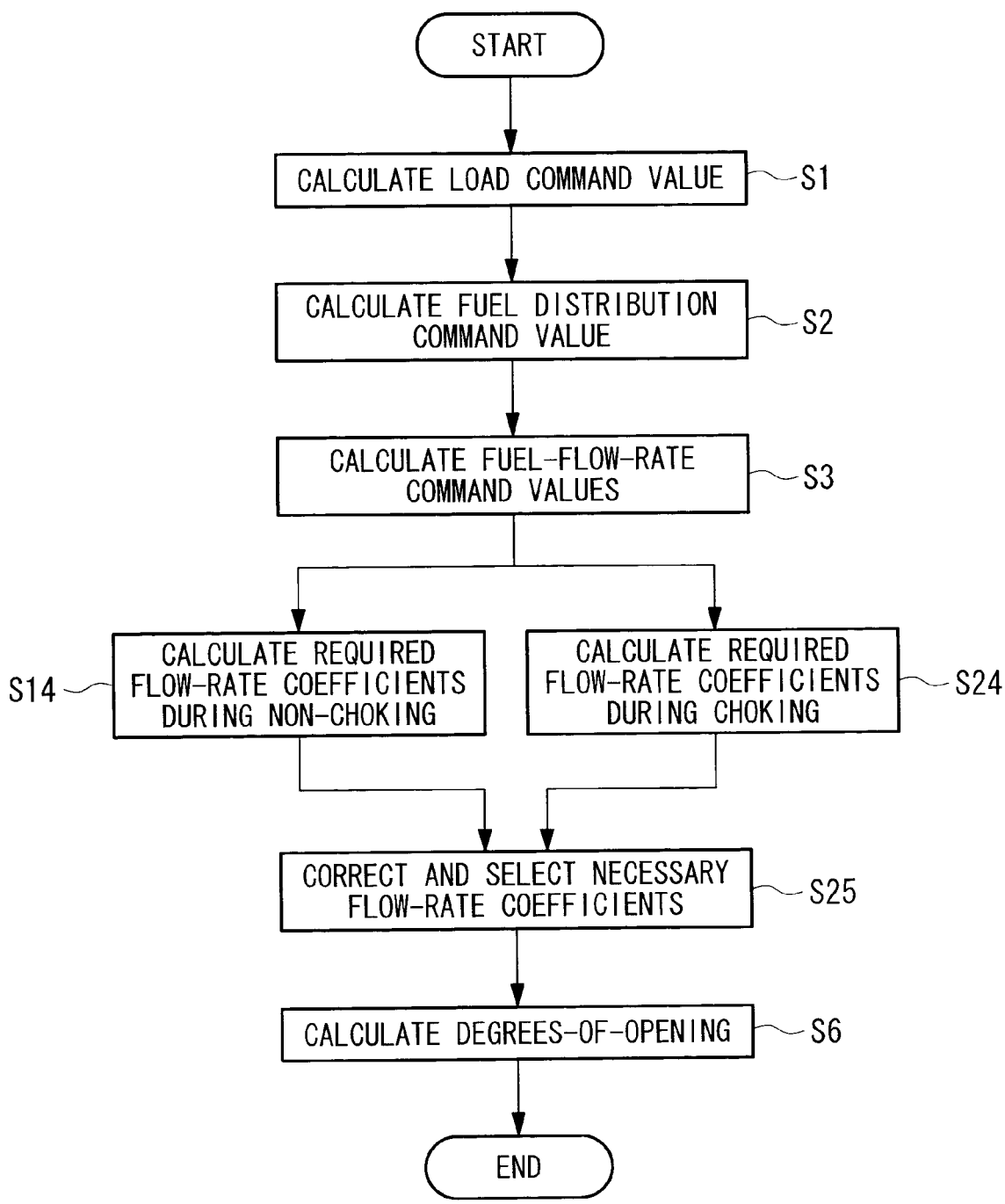
FIG. 19 is a flowchart illustrating control performed by the control unit in FIG. 17.
Figure 21:
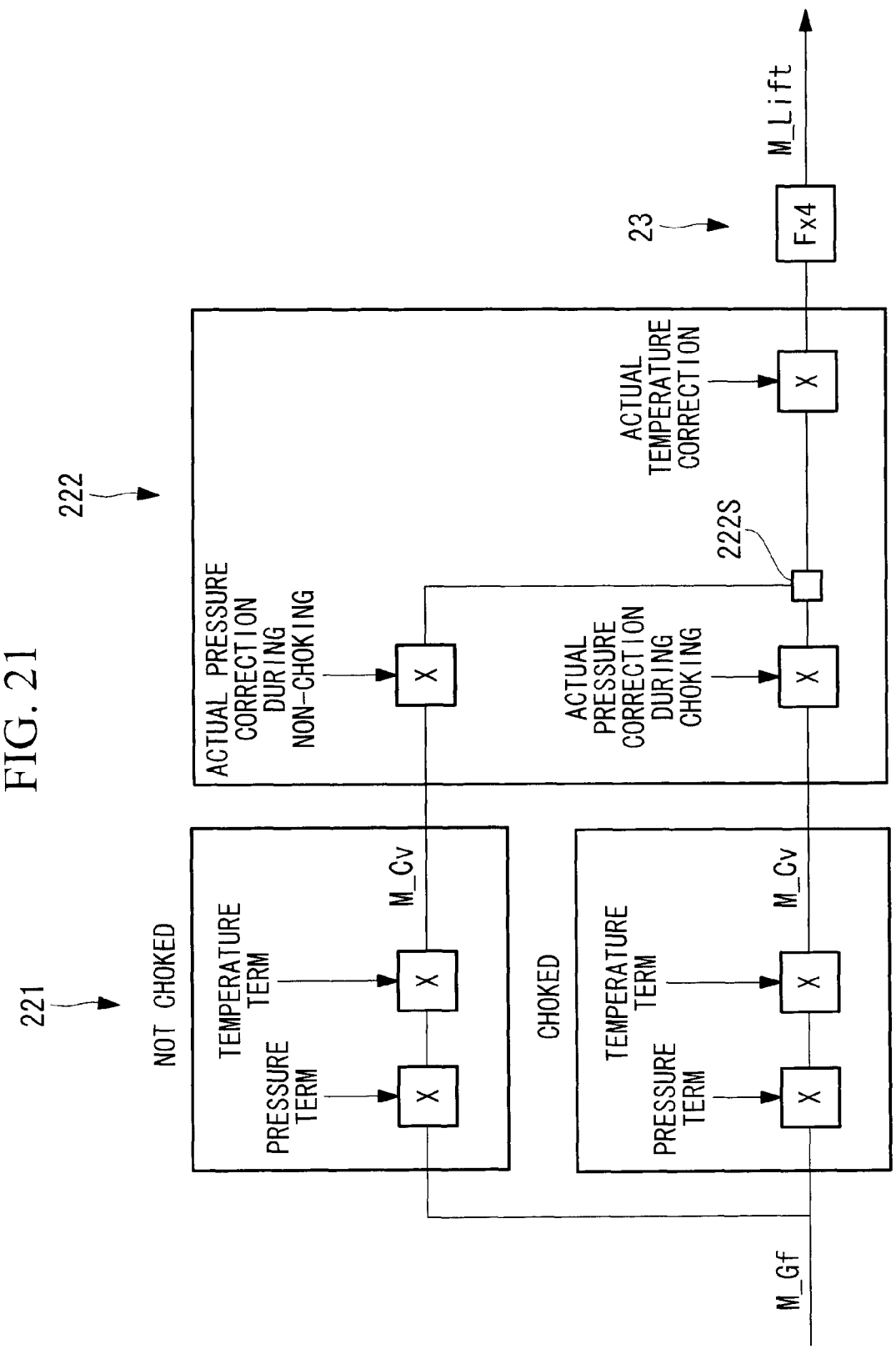
FIG. 21 is a diagram illustrating part of the control logic of the control unit in FIG. 17.
Figure 22:
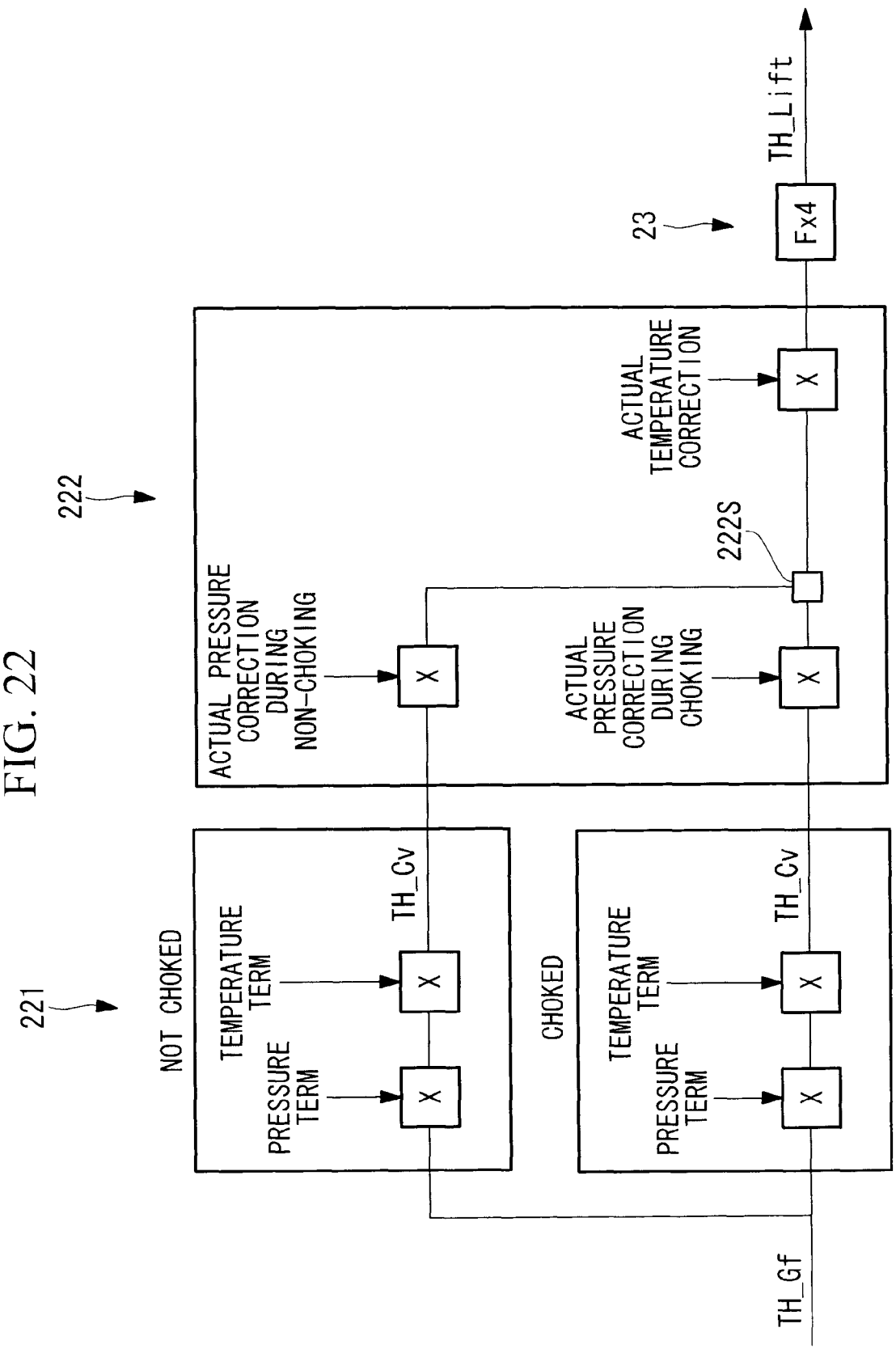
FIG. 22 is a diagram illustrating part of the control logic of the control unit in FIG. 17.

FIG. 19 is a flowchart illustrating control performed by the control unit in FIG. 17. FIGS. 20 to 22 are diagrams illustrating part of the control logic of the fuel supply unit in FIG. 17.

Here, calculation of the values of the required flow-rate coefficients PL_Cv, M_Cv, and TH_Cv, which is a feature of the fuel-gas supply control of the control unit 220 (steps S14 and S24), and correction and selection of the required flow-rate coefficients (step S25) will be described.

In other words, since the steps from calculation of the load command value (step S1) to calculation of fuel-flow-rate command values (step S3) and calculation of the degrees-of-opening (step S6) are the same as those of the first embodiment, descriptions thereof will be omitted.

As shown in FIG. 19, the fuel-flow-rate command values PL_Gf, M_Gf, and TH_Gf calculated in step S3 are input to the calculating section 221, where the values of required flow-rate coefficients PL_Cv, M_Cv, and TH_Cv in the case where the flow of fuel gas in the flow-rate regulating valve is a non-choked flow are calculated (step S14), and the values of the required flow-rate coefficients PL_Cv, M_Cv, and TH_Cv in the case where it is a choked flow are calculated (step S24).

Since a method for calculating the values of the required flow-rate coefficients PL_Cv, M_Cv, and TH_Cv in the case of a non-choked flow is the same as that of the second embodiment, a description thereof will be omitted, and a method for calculating the values of the required flow-rate coefficients PL_Cv, M_Cv, and TH_Cv in the case of a choked flow will be described.

For example, a description will be given for the pilot fuel supply line 10P. The calculating section 221 calculates the value of PL_Cv on the basis of PL_Gf, the pressure term during choking, and the temperature term.

Here, the pressure term during choking is a function based on the actual measured value P1$m$ of the fuel gas pressure upstream of the pilot flow-rate regulating valve 13P measured by the common pressure sensor 12C.

For the temperature term, the same function is used for both choking and non-choking.

Also for the main fuel supply line 10M and the top-hat fuel supply line 10T, the values of M_Cv and TH_Cv are calculated by the calculating section 221, as shown in FIGS. 21 and 22.

The calculated values of PL_Cv, M_Cv, and TH_Cv are input to the correcting section 222, the values of PL_Cv and so on are corrected by the correcting section 222, and it is determined, from a pressure calculation, whether the values of PL_Cv and so on are values during choking or non-choking, and the values of PL_Cv and so on are switched therebetween (step S25).

For example, a description will be given for the pilot fuel supply line 10P. As shown in FIG. 20, first, PL_Cv during non-choking is corrected on the basis of actual pressure correction for non-choking, and PL_Cv during choking is corrected on the basis of actual pressure correction for choking.

Here, the actual pressure correction for choking is a function based on the actual measured value P1$m$ of the fuel gas pressure upstream of the pilot flow-rate regulating valve 13P measured by the common pressure sensor 12C and the set value (predetermined pressure) P1 thereof.

Since the actual pressure correction for non-choking is the same as that of the first embodiment, a description thereof will be omitted.

PL_Cv corrected on the basis of the individual actual pressure corrections is input to a switching section 222S, where in the case of choking, it is switched to PL_Cv for choking, and in the case of non-choking, it is switched to PL_Cv for non-choking. The selected PL_Cv is corrected on the basis of actual temperature correction.

Since the actual temperature correction is the same as in the second embodiment, a description thereof will be omitted.

Also for the main fuel supply line 10M and the top-hat fuel supply line 10T, the values of M_Cv and TH_Cv are corrected by the correcting section 222 and are switched, as shown in FIGS. 21 and 22.

With the above configuration, whether the flow of fuel gas in the flow-rate regulating valves 13P, 13M, and 13T is a non-choked flow or a choked flow, the flow rate of the fuel gas can be suitably regulated.

Although the gas-turbine power generating plants of a premixed combustion type have been described in the first embodiment, the second embodiment, and the modification of the second embodiment described above, the present invention can also be applied to a gas-turbine power generating plant of a diffusion combustion type. Examples of the gas-turbine power generating plant of the diffusion combustion type include a plant equipped with one kind of fuel nozzle for diffusion combustion and a plant equipped with a plurality of different fuel nozzles for diffusion combustion.

REFERENCE SIGNS LIST 1, 101, 201 gas-turbine power generating plant
2 compressor
3 combustor
4 turbine
5 fuel supply unit (fuel supply apparatus)
10C, 110C common line
10M main fuel supply line (fuel supply line)
10P pilot fuel supply line (fuel supply line)
10T top-hat fuel supply line (fuel supply line)
11P pilot nozzle (fuel nozzle)
11M main nozzle (fuel nozzle)
11T top hat nozzle (fuel nozzle)
12C common pressure sensor (pressure measuring unit)
13P pilot flow-rate regulating valve (flow-rate regulating valve)
13M main flow-rate regulating valve (flow-rate regulating valve)
13T top-hat flow-rate regulating valve (flow-rate regulating valve)
20, 220 control unit (fuel-flow-rate control unit)
21, 121, 221 calculating section
22, 222 correcting section valve control section
114C common pressure regulating valve (pressure regulating section)

The invention claimed is:

1. A fuel supply apparatus configured to control the flow rates of fuel to be supplied to fuel nozzles provided in a combustor of a gas turbine, the apparatus comprising:
a plurality of flow-rate regulating valves which are provided in fuel supply lines that supply fuel to the fuel nozzles and which regulate the flow rates of fuel flowing through the fuel supply lines;
a calculating section that calculates required flow-rate coefficients of the flow-rate regulating valves corresponding to the fuel nozzles on the basis of at least an upstream-side fuel pressure in the fuel flow upstream of the flow-rate regulating valves, a downstream-side fuel pressure obtained using a predetermined relational expression on a basis of at least an operating parameter of a gas-turbine power generating plant including an atmosphere air temperature of the gas turbine, and the flow rates of fuel to be supplied to the fuel nozzles; and
a valve control section that controls the degrees-of-opening of the flow-rate regulating valves on the basis of the required flow-rate coefficients.

2. The fuel supply apparatus according to claim 1, further comprising:
a pressure measuring unit that measures a fuel pressure upstream of the flow-rate regulating valves,
wherein the pressure measured by the pressure measuring unit is used as the upstream-side fuel pressure for use in calculating the required flow-rate coefficients.

3. The fuel supply apparatus according to claim 1, wherein
the fuel nozzles are different kinds of fuel nozzles.

4. The fuel supply apparatus according to claim 3, further comprising:

a pressure regulating section which is provided in a common line that supplies fuel to all of the fuel supply lines and which regulates the fuel pressure upstream of the flow-rate regulating valves to a predetermined value,
wherein a predetermined pressure is used as a set value for use in calculating the required flow-rate coefficient.

5. The fuel supply apparatus according to claim 4, wherein
the flow rate of fuel to be supplied to the one fuel nozzle is calculated from a total flow rate of fuel to be supplied to the combustor, the total flow rate being determined on a basis of a load of the gas turbine, and a fuel distribution ratio among the different kinds of fuel nozzles; and
the upstream-side fuel pressure is a pressure determined on a basis of the total flow rate of fuel.

6. The fuel supply apparatus according to claim 3, wherein
the flow rate of fuel to be supplied to the one fuel nozzle is calculated from a total flow rate of fuel to be supplied to the combustor, the total flow rate being determined on a basis of a load of the gas turbine, and a fuel distribution ratio among the different kinds of fuel nozzles; and
the downstream-side fuel pressure is determined on the basis of the total flow rate of fuel.

7. The fuel supply apparatus according to claim 3, wherein
the downstream-side fuel pressure is a pressure calculated on the basis of a pressure in a casing in which the fuel nozzles are disposed; and
the pressure in the casing in which the fuel nozzles are disposed is a pressure obtained using a predetermined relational expression on a basis of an operating parameter of a gas-turbine power generating plant.

8. The fuel supply apparatus according to claim 7, further comprising a correcting section that corrects the required flow-rate coefficients calculated by the calculating section on a basis of at least an actual measured value of the pressure in the casing.

9. A gas-turbine power generating plant comprising:
a compressor that compresses air;
a combustor that generates high-temperature combustion gas by burning a gas mixture of the compressed air and fuel;
a turbine that extracts a rotary driving force from the combustion gas; and
the fuel supply apparatus according to claim 1 that supplies the fuel to the combustor.

10. A fuel-flow-rate control unit configured to control flow rates of fuel to be supplied to fuel nozzles provided in a combustor of a gas turbine, the control unit comprising:
a calculating section that calculates required flow-rate coefficients on the basis of at least an upstream-side fuel pressure in the fuel flow upstream of flow-rate regulating valves that regulate the flow rates of fuel to be supplied to the fuel nozzles, a downstream-side fuel pressure obtained using a predetermined relational expression on a basis of at least an operating parameter of a gas-turbine power generating plant including an atmosphere air temperature of the gas turbine, and the flow rates of fuel to be supplied to the fuel nozzles, the required flow-rate coefficients being coefficients of the flow-rate regulating valves corresponding to the fuel nozzles; and a valve control section that controls the degrees-of-opening of the flow-rate regulating valves on the basis of the required flow-rate coefficients.

11. The fuel-flow-rate control unit according to claim 10, wherein a measured pressure is used as the upstream-side fuel pressure for use in calculating the required flow-rate coefficients.

12. The fuel-flow-rate control unit according to claim 10, wherein
the fuel nozzles are different kinds of fuel nozzles.

13. The fuel-flow-rate control unit according to claim 12, wherein a predetermined pressure is used as a set value for use in calculating the required flow-rate coefficient.

14. The fuel-flow-rate control unit according to claim 13, wherein
the flow rate of fuel to be supplied to the one fuel nozzle is calculated from a total flow rate of fuel to be supplied to the combustor, the total flow rate being determined on a basis of a load of the gas turbine, and a fuel distribution ratio among the different kinds of fuel nozzles; and
the upstream-side fuel pressure is a pressure determined on a basis of the total flow rate of fuel.

15. The fuel-flow-rate control unit according to claim 12, wherein
the flow rate of fuel to be supplied to the one fuel nozzle is calculated from a total flow rate of fuel to be supplied to the combustor, the total flow rate being determined on a basis of a load of the gas turbine, and the fuel distribution ratio among the different kinds of fuel nozzles; and
the downstream-side fuel pressure is a pressure determined on the basis of the total flow rate of fuel.

16. The fuel-flow-rate control unit according to claim 12, wherein
the downstream-side fuel pressure is calculated on the basis of a pressure in a casing in which the fuel nozzles are disposed; and
the pressure in the casing in which the fuel nozzles are disposed is a pressure obtained using a predetermined relational expression on a basis of an operating parameter of a gas-turbine power generating plant.

17. The fuel-flow-rate control unit according to claim 16, further comprising a correcting section that corrects the required flow-rate coefficients calculated by the calculating section on a basis of at least an actual measured value of the pressure in the casing.

* * * * *